United States Patent
Honda et al.

(10) Patent No.: US 7,895,351 B2
(45) Date of Patent: Feb. 22, 2011

(54) INFORMATION RECORDING/REPRODUCING SYSTEM, INFORMATION RECORDING/REPRODUCING APPARATUS AND INFORMATION RECORDING/REPRODUCING METHOD

(75) Inventors: Tsukasa Honda, Shizuoka (JP); Kashu Takahashi, Tokyo (JP); Hidetoshi Takizawa, Shizuoka (JP); Kaichiro Matsunami, Aichi (JP)

(73) Assignee: Sony Corporation, Tokyo (JP)

( * ) Notice: Subject to any disclaimer, the term of this patent is extended or adjusted under 35 U.S.C. 154(b) by 1350 days.

(21) Appl. No.: 11/403,419

(22) Filed: Apr. 13, 2006

(65) Prior Publication Data

US 2006/0233535 A1    Oct. 19, 2006

(30) Foreign Application Priority Data

Apr. 15, 2005   (JP)   ............................. P2005-119093

(51) Int. Cl.
*G06F 15/16*    (2006.01)
*H04N 7/173*    (2006.01)

(52) U.S. Cl. ........................ 709/231; 709/219; 710/68; 710/74; 725/109; 725/119; 725/135; 386/328; 386/355

(58) Field of Classification Search .................. 368/112
See application file for complete search history.

(56) References Cited

U.S. PATENT DOCUMENTS

| | | | | |
|---|---|---|---|---|
| 5,590,139 A * | 12/1996 | Suzuki et al. | ............... | 714/800 |
| 5,875,058 A * | 2/1999 | Grubman | .................. | 359/654 |
| 5,907,660 A * | 5/1999 | Inoue et al. | ................. | 386/109 |
| 5,953,489 A * | 9/1999 | Park | ........................... | 386/109 |
| 6,654,544 B1 * | 11/2003 | Suzuki et al. | ............... | 386/112 |
| 6,973,258 B1 * | 12/2005 | Yoo et al. | ................... | 386/111 |
| 7,386,553 B2 * | 6/2008 | Itoh et al. | ........................... | 1/1 |
| 7,391,960 B2 * | 6/2008 | Shinozaki et al. | ............. | 386/96 |
| 7,680,946 B2 * | 3/2010 | Yamada et al. | .............. | 709/231 |

(Continued)

FOREIGN PATENT DOCUMENTS

EP    1575290 A2 *    9/2005

(Continued)

OTHER PUBLICATIONS

'Digital Media Converter v1.5' from deskshare.com, archive from Apr. 5, 2004.*

*Primary Examiner*—Henry W Tsai
*Assistant Examiner*—Steven G Snyder
(74) *Attorney, Agent, or Firm*—Frommer Lawrence & Haug LLP; William S. Frommer; Thomas F. Presson

(57) ABSTRACT

An information recording/reproducing system has a data storage device that stores a data stream with a predetermined data format and an information recording/reproducing apparatus, which is connected with the data storage device, for recording and reproducing the data stream. The apparatus includes information recording/reproducing portion and memory portion that stores plural species of empty data file bodies each in which additional information corresponding to a species of data format and data are assigned to loading regions. The apparatus also has selection portion that selects an empty data file body with a specified data format from the plural species of empty data file bodies. The apparatus further has information-loading portion that loads the additional information and the data into predetermined loading regions assigned in the empty data file body that has been selected by the selection portion.

3 Claims, 19 Drawing Sheets

U.S. PATENT DOCUMENTS

| | | | |
|---|---|---|---|
| 7,788,395 B2 * | 8/2010 | Bowra et al. | 709/231 |
| 2001/0031007 A1 * | 10/2001 | Fujita et al. | 375/240.25 |
| 2002/0003948 A1 * | 1/2002 | Himeno et al. | 386/98 |
| 2002/0078218 A1 * | 6/2002 | Feig | 709/231 |
| 2003/0212762 A1 * | 11/2003 | Barnes et al. | 709/219 |
| 2006/0127056 A1 * | 6/2006 | Yahata et al. | 386/112 |
| 2006/0179153 A1 * | 8/2006 | Lee et al. | 709/231 |

FOREIGN PATENT DOCUMENTS

| | | | |
|---|---|---|---|
| JP | 2003-030099 | | 1/2003 |
| JP | 2003163889 A | * | 6/2003 |
| JP | 2004-336593 | | 11/2004 |

* cited by examiner

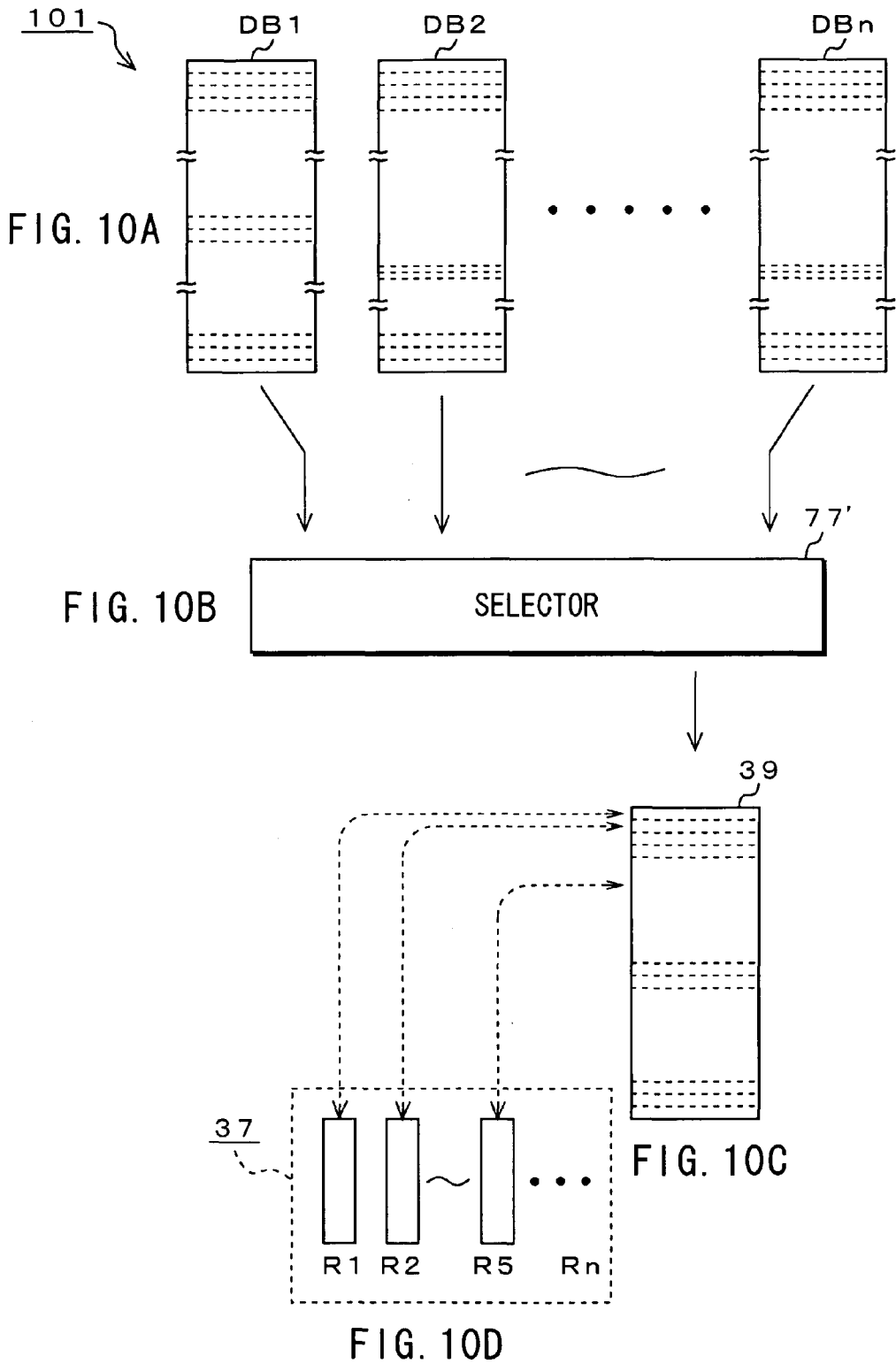

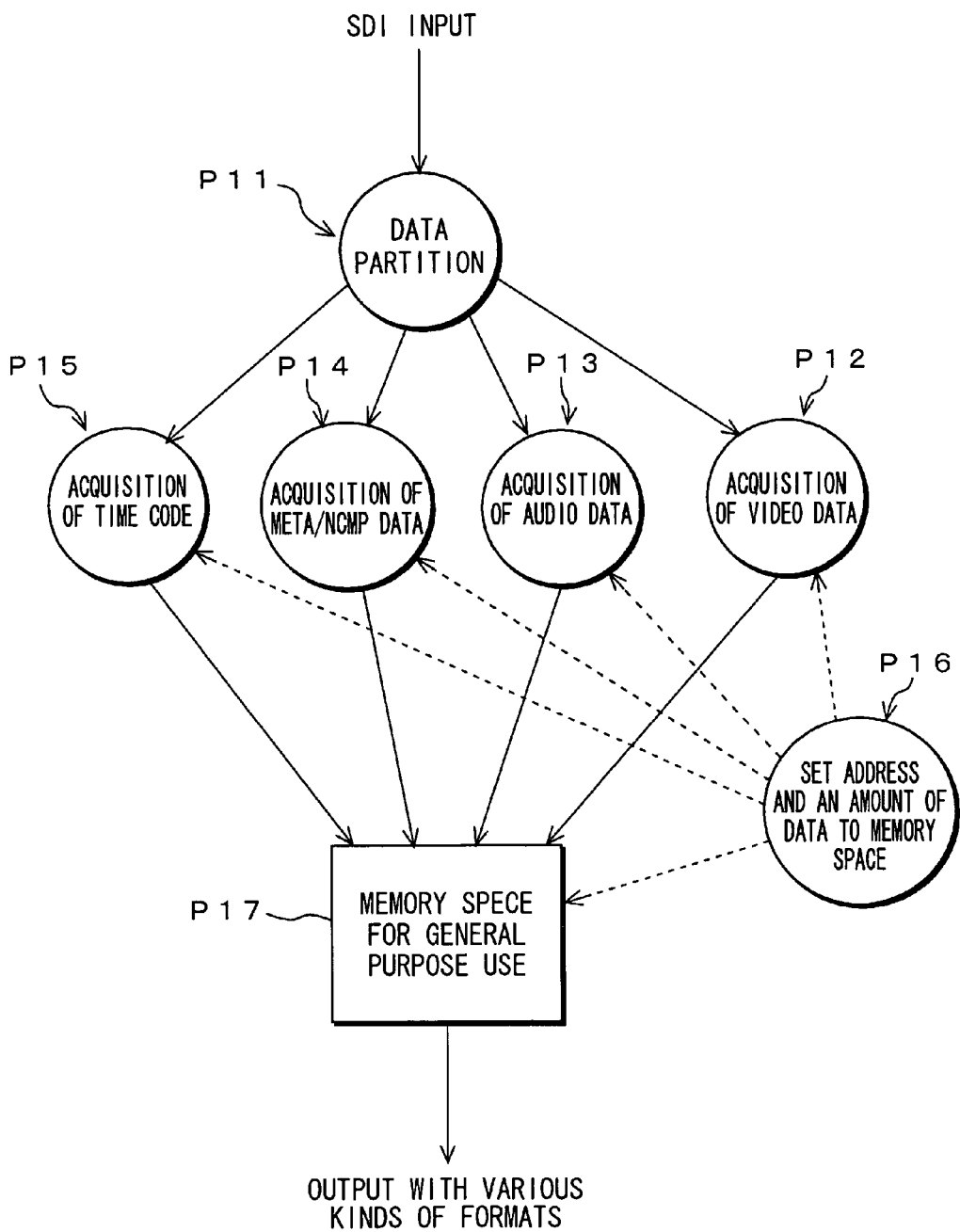

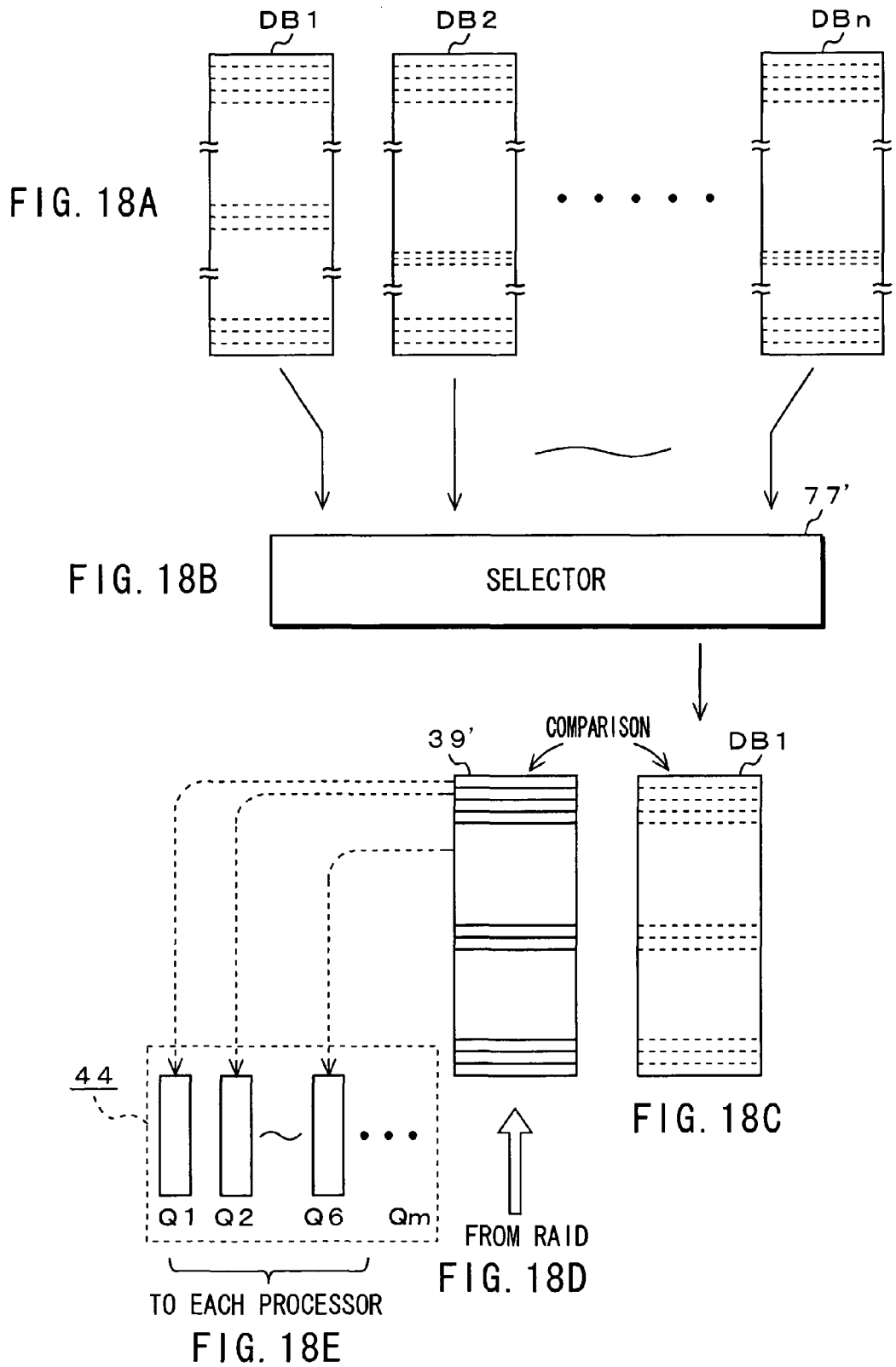

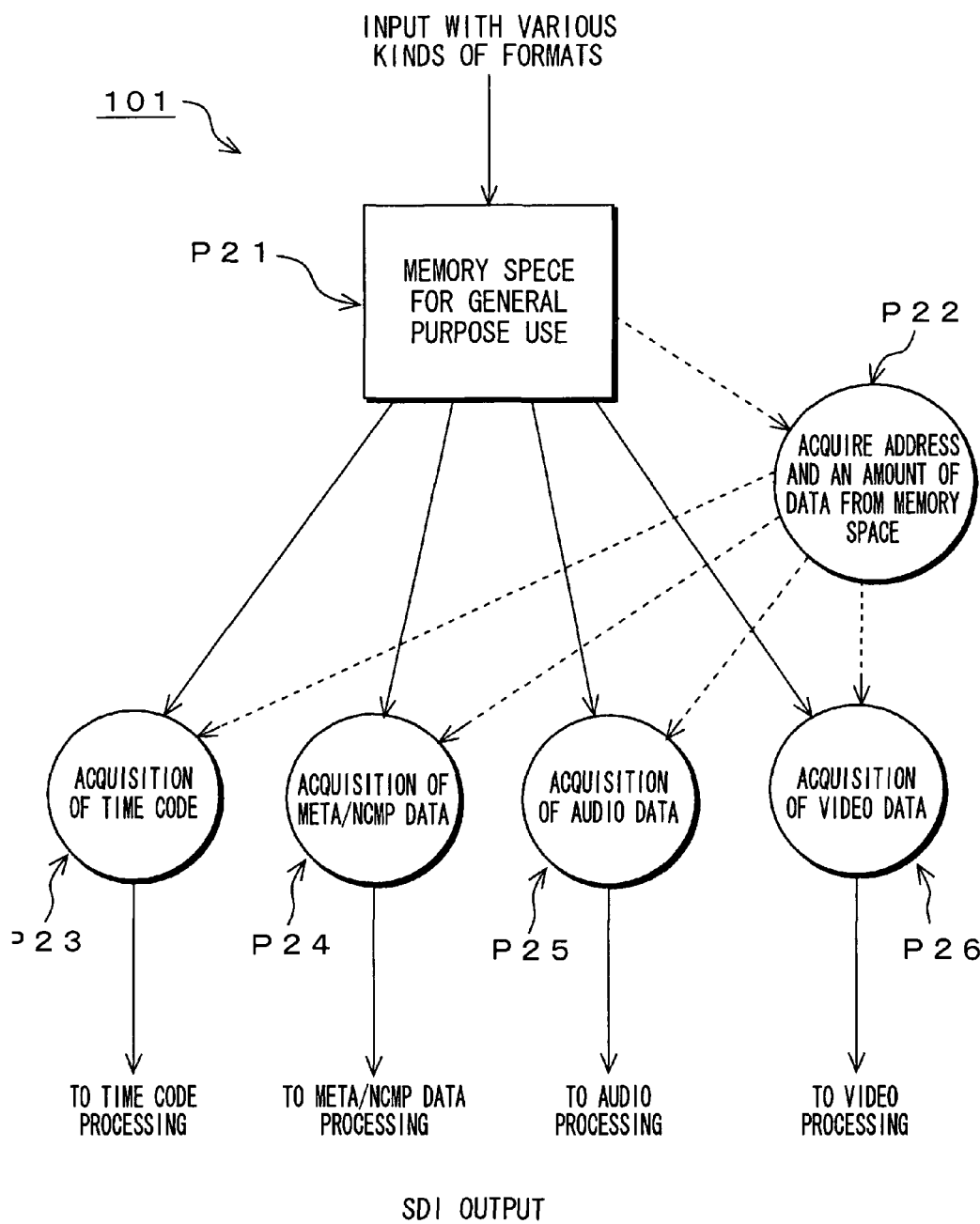

INFORMATION RECORDING/REPRODUCING SYSTEM, INFORMATION RECORDING/REPRODUCING APPARATUS AND INFORMATION RECORDING/REPRODUCING METHOD

CROSS-REFERENCE TO RELATED APPLICATION

The present invention contains subject matter related to Japanese Patent Application No. JP 2005-119093 filed in the Japanese Patent Office on Apr. 15, 2005, the entire contents of which being incorporated herein by reference.

BACKGROUND OF THE INVENTION

1. Field of the Invention

The present invention relates to an information recording/reproducing system, an information recording/reproducing apparatus and an information recording/reproducing method. More particularly, it relates to an AV sever system that stores a data stream with a predetermined data format, which is obtained by coding and compressing audio/video data, in a high-capacity storage device or reproduces the data stream from the storage device to decode and de-compress the reproduced data stream.

2. Description of Related Art

Recently, the AV server system has been often used in a broadcast station, an audio/video information distribution system or the like when editing any audio/video information. The AV server system has data recording/reproducing apparatus, data storage device and the like. The data recording/reproducing apparatus encodes and compresses any audio/video information according to any data compression standard such as MPEG when recording the data. Any additional information such as header information is added to the coded and compressed audio/video data, thereby producing (packing) MPEG data stream.

The data recording/reproducing apparatus reads the MPEG data stream out of the data storage device and decodes and uncompresses the read MPEG data stream. The decoded and uncompressed audio/video data becomes audio/video information (de-packing). The de-packed audio/video information is transmitted to a monitor. Thus, the AV server system converts the received data to data with a predetermined data format and stores the converted data stream in the data storage device.

Such the AV server system has data storing/reproducing apparatus (see Japanese Patent Application Publication No. 2001-54048). The data storing/reproducing apparatus has format-converting device that converts a data format in terminal device connected to a network into a predetermined data format in the data storing/reproducing apparatus. This is because such a configuration of the data storing/reproducing apparatus allows a multiplicity of uses for terminal device to be kept, thereby enabling the terminal device to access any files stored in the data storing/reproducing apparatus without any restrictions.

Information-processing apparatus and method, record medium for program and program therefor have been disclosed (see Japanese Patent Application Publication No. 2004-336593). The information-processing apparatus has body-generating device, header-generating device, and file-generating device, which are used when a file having a data format constituted of header, body, and footer is produced. The body-generating device generates the body based on the input data; the header-generating device acquires a size of the input data to generate table information and to generate header information based on the table information; and the file-generating device combines the header information, the body information, and the footer information after generating the body. Such an information-processing apparatus enables any files to be exchanged between broadcast equipment and a personal computer.

SUMMARY OF THE INVENTION

The format-converting device of the above data storing/reproducing apparatus is depended on any hardware in order to increase a speed of data processing. The hardware controls most thereof. Any data format corresponding to the data storing/reproducing apparatus is also depended on a scale of hardware in the format-converting device, so that when the data storing/reproducing apparatus is once manufactured, it is necessary that the data format is converted into a data format used in the data storage device.

If any data format to be utilized in the AV server is added and/or altered using any functions of the above information-processing apparatus, any addition and/or alteration of hardware for performing packing/de-packing are necessary, thereby increasing a scale of hardware due to the multi-format thereof.

It is desirable to provide an information recording/reproducing system, an information recording/reproducing apparatus and an information recording/reproducing method that are possible to convert any input data such as audio/video data into data stream with a desired data format without any dependence on a scale of the hardware, and improve any redundancy of pack/de-pack processing in input/output block of the data storage system.

According to an embodiment of the invention, there is provided an information recording/reproducing system. The information recording/reproducing system has a data storage device that stores the data stream with a predetermined data format and an information recording/reproducing apparatus that records and reproduces the data stream, the information recording/reproducing apparatus being connected with the data storage device. The information recording/reproducing apparatus includes information recording/reproducing portion that records and reproduces the data stream and memory portion that stores plural species of empty data file bodies each in which additional information and data are assigned to loading regions, the additional information corresponding to a species of data format. The information recording/reproducing apparatus selection portion that selects an empty data file body with a specified data format from the plural species of empty data file bodies that are stored in the memory portion, and information-loading portion that loads the additional information and the data into predetermined loading regions assigned in the empty data file body that has been selected by the selection portion.

In this embodiment of the information recording/reproducing system, the memory portion of the information recording/reproducing apparatus connected with the data storage device previously stores plural species of empty data file bodies each in which additional information corresponding to a species of data format and data are assigned to loading regions. As assumption of this, when recording a data stream with a predetermined data format from the information recording/reproducing portion in the data storage device, the selection portion selects an empty data file body with a specified data format from the plural species of empty data file bodies that are stored in the memory portion. The information-loading portion loads the additional information and the data into predetermined loading regions assigned in the empty data file body that has been selected by the selection portion.

This allows input data such as audio data and video data to be converted into any data stream with a desired data format with any software processing without depending on a size of hardware, thereby enabling a pack function in the input/output block of the data storage device to have any redundancy. Thus, this embodiment of the information recording/reproducing system according to the invention can be suitably applied to an AV server system.

Further, when the information recording/reproducing portion reproduces data, the memory portion spreads the data stream with the predetermined data format that is read out of the data storage device and the selection portion selects an empty data file body with a data format corresponding to a data file body that fills a data stream spread in the memory portion. The control portion allows for comparing the data file body that fills a data stream spread in the memory portion with the empty data file body selected by the selection portion to search the loading regions of the additional information and the data, and controls the memory portion to extract the additional information from the loading region of the additional information in the filled data file body and to extract the data from the loading region of the data in the filled data file body.

This allows any data stream with a desired data format to be converted into output data such as audio data and video data with any software processing without depending on a size of hardware, thereby enabling a de-pack function in the input/output block of the data storage device to have any redundancy.

According to another embodiment of the invention, there is provided an information recording/reproducing apparatus. This information recording/reproducing apparatus has information recording/reproducing portion that records and reproduces information and memory portion that stores plural species of empty data file bodies each in which additional information and data are assigned to loading regions, the additional information corresponding to a species of data format. The information recording/reproducing apparatus also has selection portion that selects an empty data file body with a specified data format from the plural species of empty data file bodies that are stored in the memory portion, and information-loading portion that loads the additional information and data into predetermined loading regions assigned in the empty data file body that has been selected by the selection portion.

In this embodiment of the information recording/reproducing system, when recording a data stream with a predetermined data format in the data storage device, the memory portion previously stores plural species of empty data file bodies each in which additional information corresponding to a species of data format and data are assigned to loading regions. As assumption of this, when the information recording/reproducing portion records the data stream with a predetermined data format, the selection portion selects an empty data file body with a specified data format from the plural species of empty data file bodies that are stored in the memory portion. The information-loading portion loads the data and the additional information relative to the data into the predetermined loading regions assigned in the empty data file body that has been selected by the selection portion.

This allows input data such as audio data and video data to be converted into any data stream with a desired data format with any software processing without depending on a size of hardware, thereby enabling a pack/de-pack function in the input/output block of the data storage device to have any redundancy. Thus, this embodiment of the information recording/reproducing apparatus according to the invention can be suitably applied to an AV server system.

According to further embodiment of the invention, there is provided an information recording/reproducing method. The information recording/reproducing method has the step of specifying, from the plural species of empty data file bodies each in which loading regions of additional information corresponding to a species of data format and data are assigned, an empty data file body with a desired data format and selecting this empty data file body. The method has the step of loading the additional information and the data into the predetermined loading regions assigned in the empty data file body that has been selected.

The embodiment of the information recording/reproducing method allows input data such as audio data and video data to be converted into any data stream with a desired data format with any software processing without depending on a size of hardware when recording the data stream with the predetermined data format, thereby enabling a pack/de-pack function in the input/output block of the data storage device to have any redundancy. Thus, this embodiment of the information recording/reproducing apparatus according to the invention can be suitably applied to an AV server system.

Thus, according to the embodiments, it is possible to present digital information recording/reproducing apparatus that is applicable to any multi-format and/or format-converter having any enriched redundancy.

The concluding portion of this specification particularly points out and directly claims the subject matter of the present invention. However that skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 10A through 10D are diagrams each for showing a selection example of an empty data file body DB1 and pack processing therefor;

FIG. 17 is a module drawing for showing an example of pack processing in the data recording/reproducing device;

FIGS. 18A through 18E are conceptual drawings each for showing an example of de-pack processing as a second embodiment; and FIG. 19 is a module drawing for showing an example of de-pack processing in the data recording/reproducing device.

DESCRIPTION OF THE INVENTION

Figure 1:
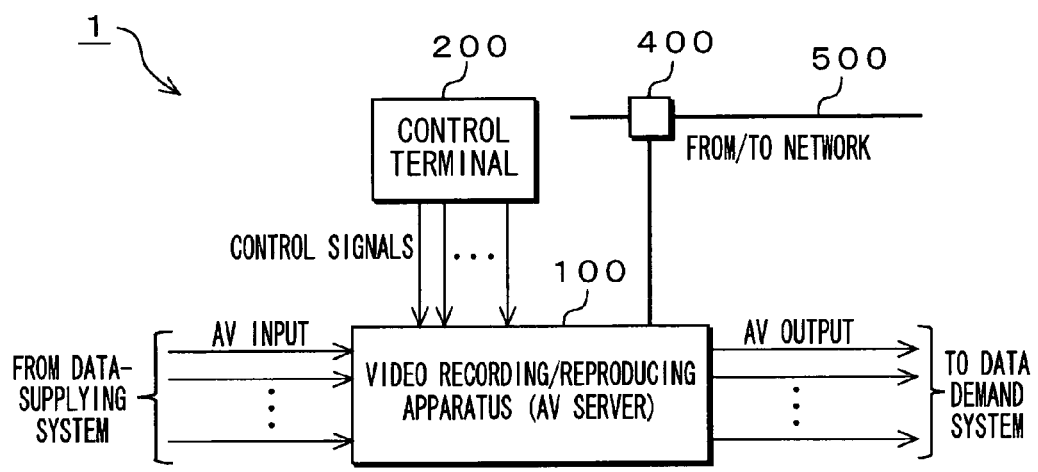
FIG. 1 is a block diagram for showing a configuration of an embodiment of AV server system according to the invention.

Referring now to the drawings, preferred embodiments of an information management system, an information management apparatus, and an information management method according to the invention will be described specifically below.

FIG. 1 shows a configuration of an embodiment of an AV server system 1 according to the invention.

The AV server system 1 shown in FIG. 1 is an example of an information management system. In a broadcast station or an information distribution center on video and audio (including sound and music), the AV server system 1 writes and records an audio and/or video (AV) data stream in any data storage device and/or reads the AV data stream out of the data storage device and reproduces the AV data stream.

The AV server system 1 has a video recording/reproducing apparatus (hereinafter, referred to as "AV server 100") and a control terminal 200. When recording the data, the AV server 100 receives pieces of information on video and audio materials (AV input) and encodes them as the data under the recording control of the control terminal 200. The AV server 100 then adds any additional information to the encoded data to produce a data stream with a predetermined data format. The AV server 100 records and stores this data stream.

When reproducing the data, the AV server 100 reads the data stream with a predetermined data format, which has been recorded and stored, under the reproducing control of the control terminal 200. The AV server 100 decodes the read data stream with a predetermined data format. After decoding, the AV server 100 outputs the data (AV output). The AV server 100 is connected with a network 500 through a HUB 400. The AV server 100 receives or transmits the data stream with a predetermined data format from or to the network 500. This is because a priority of an access from the network 500 is established so that the AV server 100 can record and manage file format data such as MXF file format data and AVI format data as it is if it is at all possible.

Figure 2:
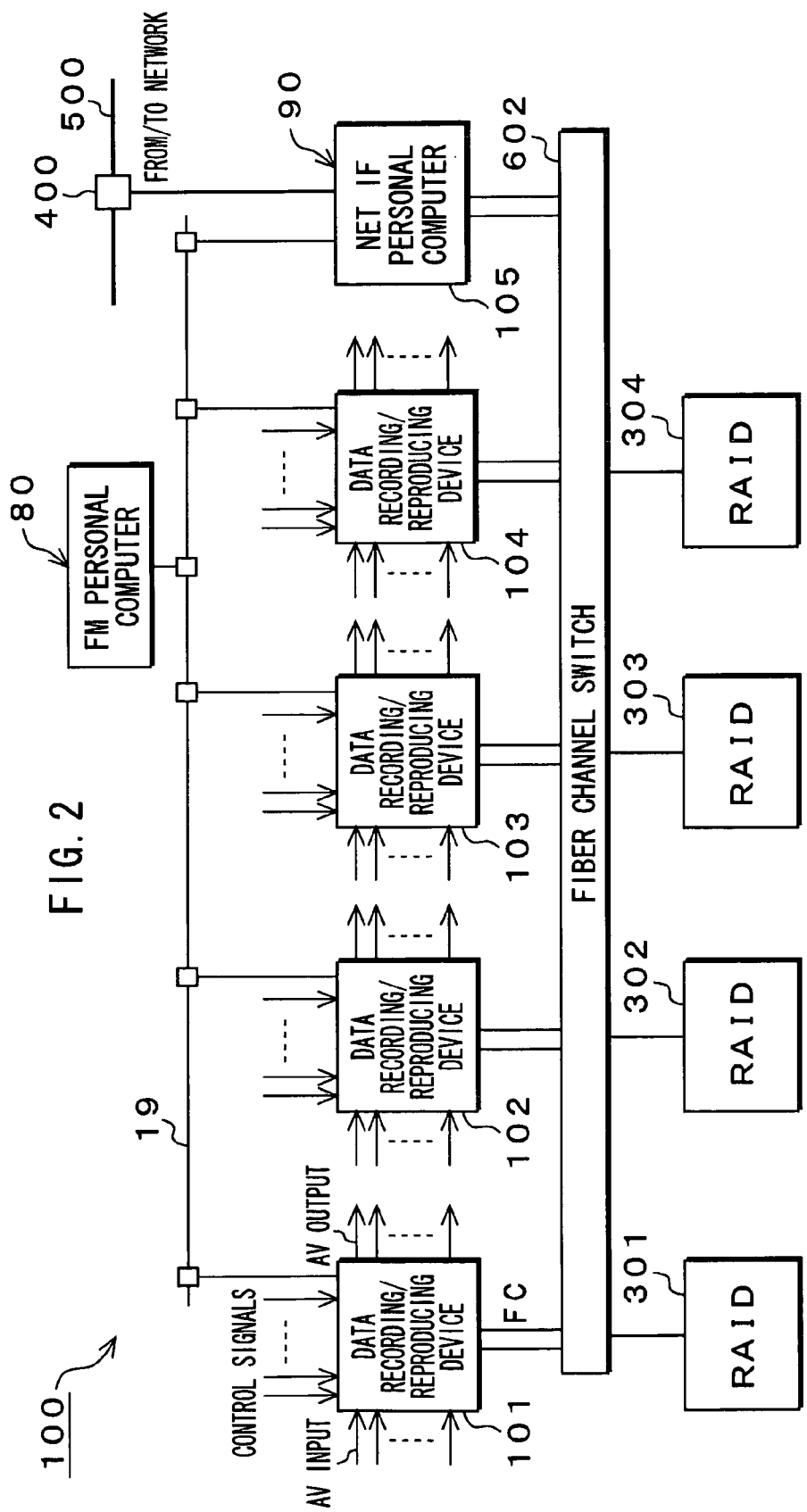
FIG. 2 is a block diagram for showing an internal configuration of an embodiment of the AV server according to the invention.

FIG. 2 shows an internal configuration of an embodiment of the AV server 100. The AV server 100 shown in FIG. 2 has a personal computer (hereinafter referred to as "FM personal computer 80") for file system (as a file manager), a personal computer (hereinafter referred to as "Net IF personal computer 90") for network interface, four data recording/reproducing devices 101-104, four data storage devices (hereinafter referred to as "RAID") 301-304, and a fiber channel switch 602.

The FM personal computer 80 is connected to the Net IF personal computer 90 and the four data recording/reproducing devices 101-104 through a local area network (LAN) 19 such as ETHERNET (trade mark). The FM personal computer 80 manages any additional information (file information) of the AV data stream to be managed in the AV server 100. The FM personal computer 80 holds any information to be positioned in any file header portion and file footer portion, which are added to the AV data, via the data recording/reproducing device 101 or the like.

The Net IF personal computer 90 is connected with the network 500. The Net IF personal computer 90 receives any data stream with a general-purpose format from a data-supplying system and separates any additional information from the received data stream to hold and manage AV data obtained by separating the additional information from the data stream. The data stream with a general-purpose format is constituted of AV data including audio data and video data and any additional information. The additional information includes a file header portion and a file footer portion. For example, the Net IF personal computer 90 performs any addition or any deletion of the file header portion and the file footer portion based on any information from the FM personal computer 80 when the Net IF personal computer 90 receives or transmits the data via the network. The addition or deletion is performs so that the AV server 100 can record or manage the data stream with a general-purpose format from the network 500 exactly and smoothly.

Each of the data recording/reproducing devices 101-104 is connected with the fiber channel switch 602 through an optical communication line (fiber channel (FC)) to implement any high-speed write/read operations of data. The fiber channel switch 602 is connected with the four RAIDs 301-304. As the RAIDs 301-304, recording medium or the like such as a magnetic disk or a magneto optical disk is used.

When recording the data, the data recording/reproducing device 101 receives any information on video and audio materials (SDI data as AV input) and encodes and compresses (performs encoding on) the SDI data according to a predetermined compression standard (MPEG or the like) under the recording control of the control terminal 200. The SDI data relates to any information on video and audio materials that is produced or edited according to NTSC scheme or PAL scheme in data-supplying system 600 such as a broadcast station or an information distribution center on video and audio. The data recording/reproducing device 101 adds any additional information to the AV data that is obtained by compressing the SDI data to produce an AV data stream with a predetermined format. The AV data stream is recorded in any of the RAIDs 301-304 through the fiber channel switch 602.

When reproducing the data, the data recording/reproducing device 101 reads the AV data stream with a predetermined data format based on the additional information from any of the RAIDs 301-304 under the reproducing control of the control terminal 200. The data recording/reproducing device 101 decodes and uncompresses (performs decoding on) the AV data stream with a predetermined data format, which is read out of, for example, the RAID 301. The data recording/reproducing device 101 then outputs the SDI data obtained by decoding and uncompressing the AV data stream as the AV output to, for example, an image display device or an audio output device.

Figure 3:
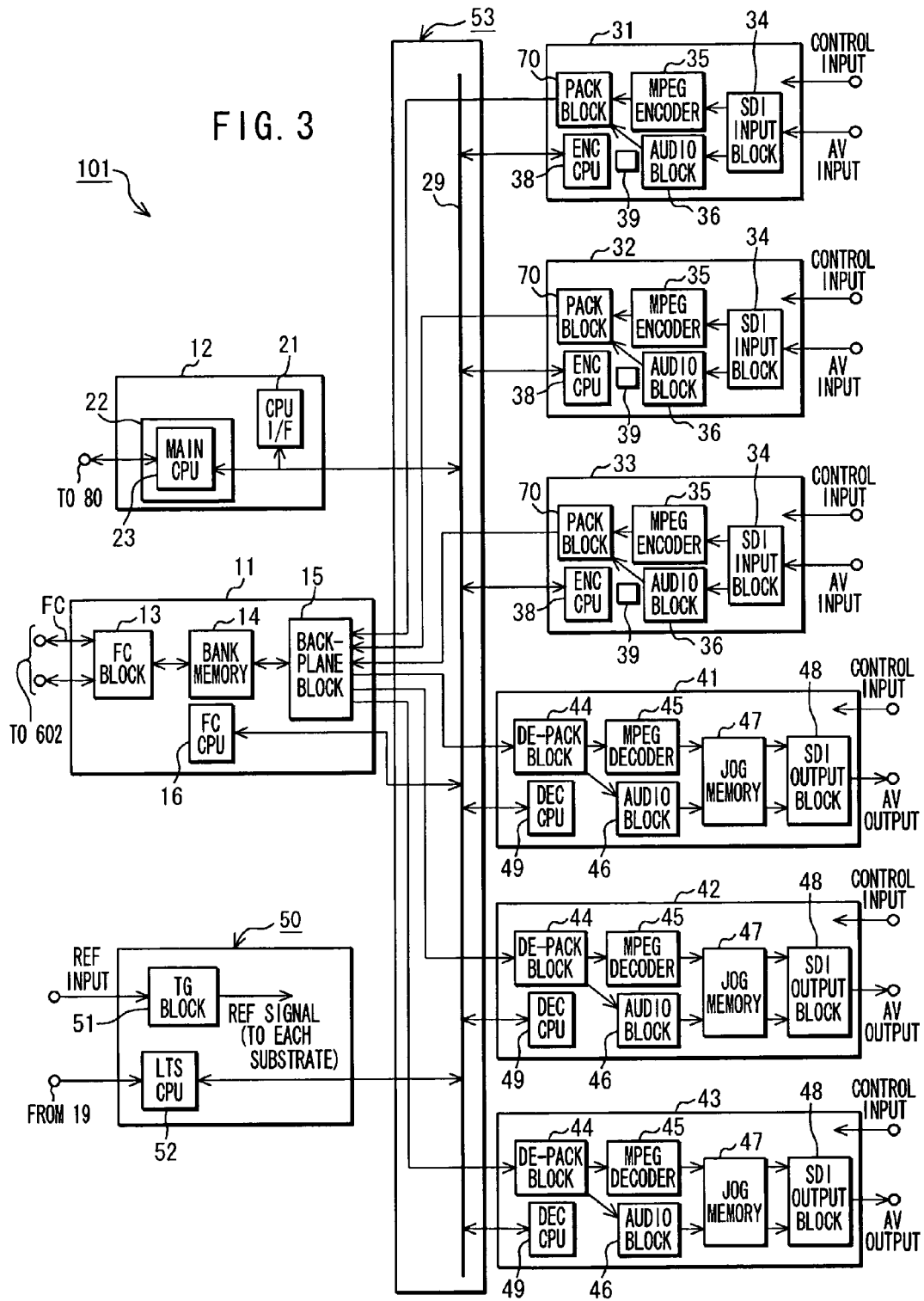
FIG. 3 is a block diagram for showing an internal configuration of an embodiment of data recording/reproducing device according to the invention.

FIG. 3 shows an internal configuration of an embodiment of the data recording/reproducing device 101 according to the invention.

The data recording/reproducing device 101 shown in FIG. 3 has one substrate for inputting/outputting data to/from the fiber channel (hereinafter referred to as "FC input/output substrate 11"), three encoder substrates (hereinafter referred to as "ENC substrates 31-33"), three decoder substrates (hereinafter referred to as "DEC substrates 41-43"), and one record/reproduction control substrate 12.

The record/reproduction control substrate 12 has a CPU interface (hereinafter referred to as "CPU I/F circuit 21") and a CPU block 22. The CPU block 22 has a main CPU 23 (a first control system). The main CPU 23 controls circuits and/or memories mounted on the FC input/output substrate 11. For example, the CPU 23 acquires any information on a writing area in the RAID 301 from the FM personal computer 80 and allows the RAID 301 to record the AV data stream when data of the AV data stream Std occupies a previously reserved address area in a bank memory 14 mounted on the FC input/output substrate 11. An I/O port, which is not shown, of the record/reproduction control substrate 12 is connected with an AV serial backplane 53. To the AV serial backplane 53, the FC input/output substrate 11 is connected.

The FC input/output substrate 11 is configured as a recording/reproducing portion. The FC input/output substrate 11 has a fiber channel interface circuit (hereinafter referred to as "FC block 13"), a bank memory 14, an encoder/decoder interface circuit (hereinafter referred to as "backplane block 15"), and an FC sub CPU 16 (shown as FC CPU in the drawing). The FC block 13 is constituted of field programmable gate array (FPGA) and has an optical signal processing function. For example, the FC block 13 is connected with the fiber channel switch 602. The FC block 13 also has an optical-signal-processing portion, which is not shown, for performing any optical signal processing such as optical modulation based on the data stream. The FC block 13 is connected to the bank memory 14 that stores the AV data stream Std in units of frame. For example, the AV data stream Std is written to an indicated address area in the bank memory 14. Information on the address area is added (placed) on the AV data stream Std one upon another.

The AV data stream Std is transferred to the address area indicated by the information. This allows the bank memory 14 to perform buffering of the AV data stream Std. As the bank memory 14, a hard disk or the like is used. The bank memory 14 is connected with the backplane block 15. The backplane block 15 is connected with the AV serial backplane 53 that receives and transmits the AV data stream Std from and to an I/O port of each of the ENC substrates 31-33 and the DEC substrates 41-43.

The FC sub CPU 16, which is constituted of FPGA and is local and auxiliary CPU (Nios) against the main CPU 23, is built in the FC input/output substrate 11. The FC sub CPU 16 arbitrates destinations to which the AV data streams Std that are received from the plural ENC substrates 31-33 are transferred when recording the data. The FC sub CPU 16 also controls the FC block 13 to read and write the AV data stream from and to the bank memory 14 based on any control commands from the main CPU 23 and performs access control to RAID 301 or the like via the fiber channel switch 602. For example, the FC sub CPU 16 receives from the main CPU 23 the information on an area where the AV data stream Std is to be written in RAID 301 and controls the FC block 13 to write the AV data stream stored on the bank memory 14 to RAID 301 based on this information.

To the AV serial backplane 53, the ENC substrates 31-33 and the DEC substrates 41-43 are connected. The ENC substrate 31 has an SDI receiving block 34, an MPEG encoder 35, an audio block 36, a pack block 70, an ENC sub CPU 38 (shown as ENC CPU in the drawing), and a mini bank memory 39.

The ENC substrate 31 receives an audio/video signal SDI of NTSC scheme or PAL scheme when recording the data and encodes and compresses (performs encoding on) the received signal SDI based on any signal compression standard such as MPEG. The ENC substrate 31 adds any additional information to audio/video data that is obtained by compressing the signal SDI to produce an AV data stream Std. The ENC substrate 31 transmits the AV data stream Std to the FC input/output substrate 11 at any time under the control of the main CPU 23 for every time when the AV data stream Std of one frame is stored in the bank memory 14. This is carried out when the ENC substrate 31 receives any control signals from the control terminal 200. The ENC substrate 31 and the like are connected to the control terminal 200 through a communication cable using any communication protocol such as RS-422A.

In this embodiment, relative to instruction which position in the bank memory 14 the AV data stream is to be transferred to, information thereon is placed on the AV data stream one upon another. This enables the AV data stream Std to be written in an instructed address area in the bank memory 14. Similarly, other ENC substrates 32 and 33 receive audio/video signal SDI and transfer the AV data stream Std. These other ENC substrates 32 and 33 have the same configuration and function as those of the ENC substrate 31, a detailed explanation of which will be omitted.

The DEC substrate 41 has a de-pack block 44, an MPEG decoder 45, an audio block 46, a jog memory 47, an SDI output block 48, and an DEC sub CPU 49 (shown as DEC CPU in the drawing).

When reproducing the data, the DEC substrate 41 receives the AV data stream Std from the bank memory 14 by the de-pack block 44. The de-pack block 44 separates any additional information from the AV data stream Std to produce MPEG data stream. The de-pack block 44 transmits the MPEG data stream from which the additional information is separated to the MPEG decoder 45 and the audio block 46, respectively. The MPEG decoder 45 decodes and decompresses (performs decoding on) the MPEG data stream based on a predetermined MPEG standard to output the video data. The audio block 46 performs decoding on the MPEG data stream to output the audio data.

The jog memory 47 stores audio and video data thus de-packed and decoded. The audio and video data thus decoded becomes SDI data. The jog memory 47 transmits such the SDI data to, for example, an image display device or an audio output device through the SDI output block 48.

It is to be noted that the DEC substrate 41 receives any control signals from the control terminal 200. The DEC substrate 41 and the like are connected to the control terminal 200 through a communication cable using any communication protocol such as RS-422A. Similarly, other DEC substrates 42 and 43 receive the AV data stream Std and transmit the SDI data. These other DEC substrates 42 and 43 have the same configuration and function as those of the DEC substrate 41, a detailed explanation of which will be omitted.

In the above AV serial backplane 53, a CPU bus 29 is provided. To the CPU bus 29, the FC sub CPU 16, the main CPU 23, the ENC sub CPU 38 on each of the ENC substrates 31-33, the DEC sub CPU 49 on each of the DEC substrates 41-43, and an REF input substrate 50 are connected. The REF input substrate 50 has a TG block 51 and an LTS sub CPU 52 (shown as LTS CPU in the drawing). The TG block 51 receives an REF signal (frame synchronizing signal) and supplies the REF signal to each of the substrates 11, 12, 31-33, 41-43, and the like under the control of the LTS sub CPU 52. The LTS sub CPU 52 is connected to the FM personal computer 80 and the Net IF personal computer 90 via ETHERNET (trade mark) 19 and to the CPU bus 29 to communicate with the FM personal computer 80, the Net IF personal computer 90, the main CPU 23 and the like. In this embodiment, other data recording/reproducing devices 102-104 have the same configuration as that of the data recording/reproducing device 101, a detailed explanation of which will be omitted.

Figure 4:
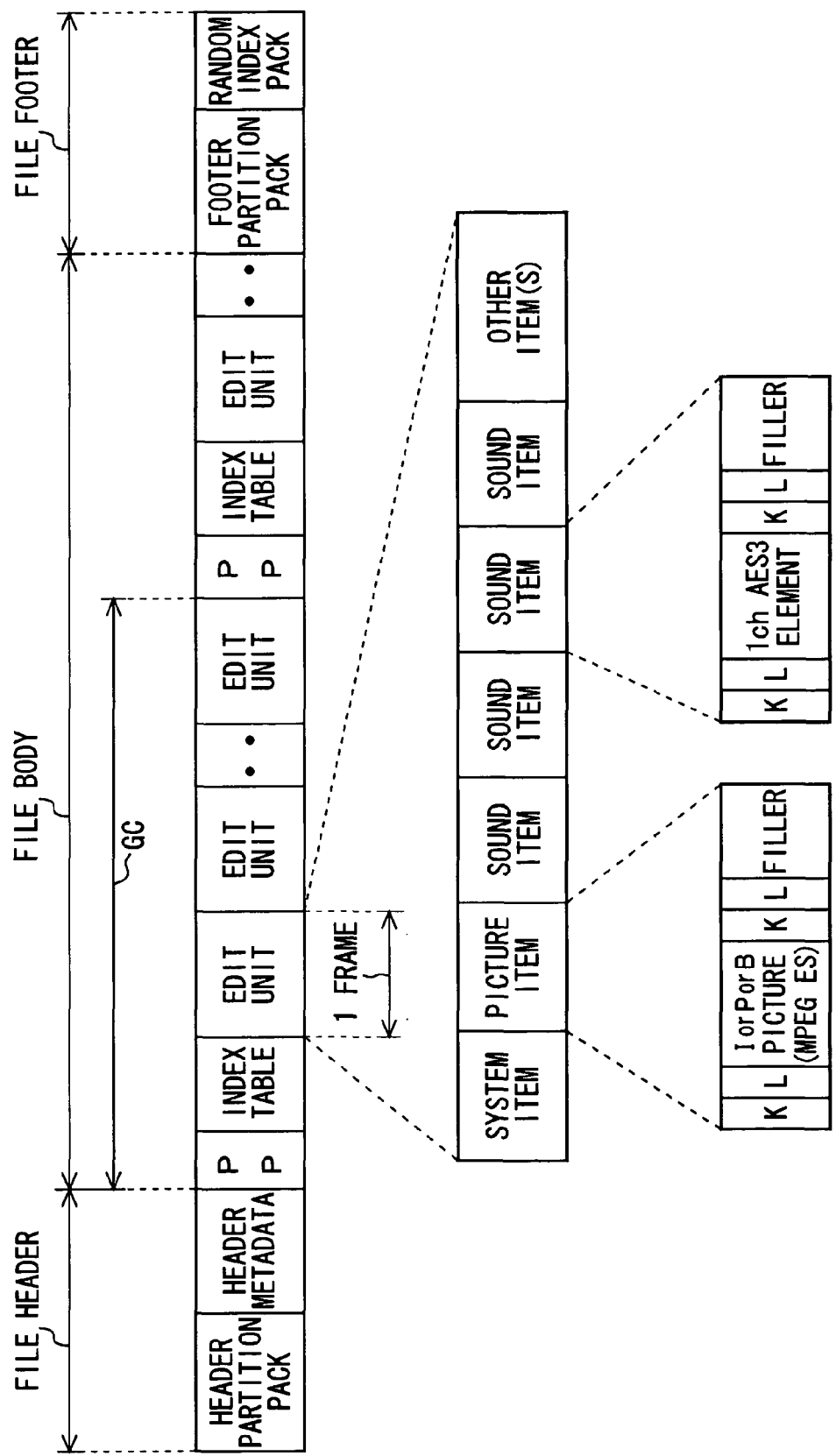
FIG. 4 is a diagram for showing an example of data structure in MXF file.

FIG. 4 shows a format example of a data structure in MXF file.

The data structure in MXF file shown in FIG. 4 is preferably applied to an AV multiple data format, which is used in an embodiment of the AV server system 1 according to the invention. In the data structure in MXF file, the AV data stream Std is constituted of a file header portion, a file body portion, and a file footer portion, which have a hierarchy structure.

The file body portion includes video data and audio data that are multiplex as the AV data, for example, in units of 60 frames (in a case of NTSC). This MXF file corresponds to any various recording formats without depending on a platform and corresponds to Quick Time (QT) (trade mark) that is scalable software.

The file header portion includes any necessary information for reproducing and/or editing the video data and audio data arranged in the file body portion according to the MXF standard using QT. In the file header portion, Run In, Header Partition Pack, and Header Metadata are arranged in turn as MXF header from a top thereof to an end thereof.

The Run In is an option for interpreting a start of the MXF header if a pattern by 11 bytes is met. The Run In can be saved up to 64 kilo bytes at a maximum but to 8 bytes in this embodiment. As Run In, any pattern other than the pattern by 11 bytes can be used in the MXF header.

The Header Partition Pack includes the pattern by 11 bytes that is used for identifying the file header portion, information indicating a form of data that is arranged in the file body portion and a file format thereof and the like. The Header Metadata includes information that is necessary for reading the AV data arranged in the file body portion.

The file body portion is constituted of a generic container (GC) or an essence container (EC). The generic container includes a Partition Pack (PP), an Index Table, and Edit Units. The Edit Units are arranged in unites of frame from a first frame to tenth frame.

The file footer portion includes a footer partition pack and a random index pack.

The Edit Unit of one frame includes the AV data that is multiplex, for example, in units of 60 frames (in a case of NTSC). The Edit Unit of one frame includes a System Item, a Picture Item, a Sound Item, and Other Item(s) (Auxiliary).

The System Item describes a local time code (LTC), UMID, and Essence Mark. The Sound Item includes, for example, four blocks. The Picture Item includes a key (K) and a data length (L) as well as I, P or B picture (MPEG ES) as a lower hierarch thereof, followed by K, L, and Filler. The Sound Item includes K and L as well as 1ch AES3 Element as a lower hierarch thereof, followed by K, L, and Filler.

The file footer portion includes Footer Partition Pack. The Footer Partition Pack includes data for identifying the file footer portion.

If giving the MXF file thus configured, the AV server 100 based on the MXF standard first reads the pattern by 11 bytes in the Header Partition Pack to discover the MXF header. The AV server 100 can read the AV data included in the GC based on the Header Metadata in the MXF header.

Figure 5:
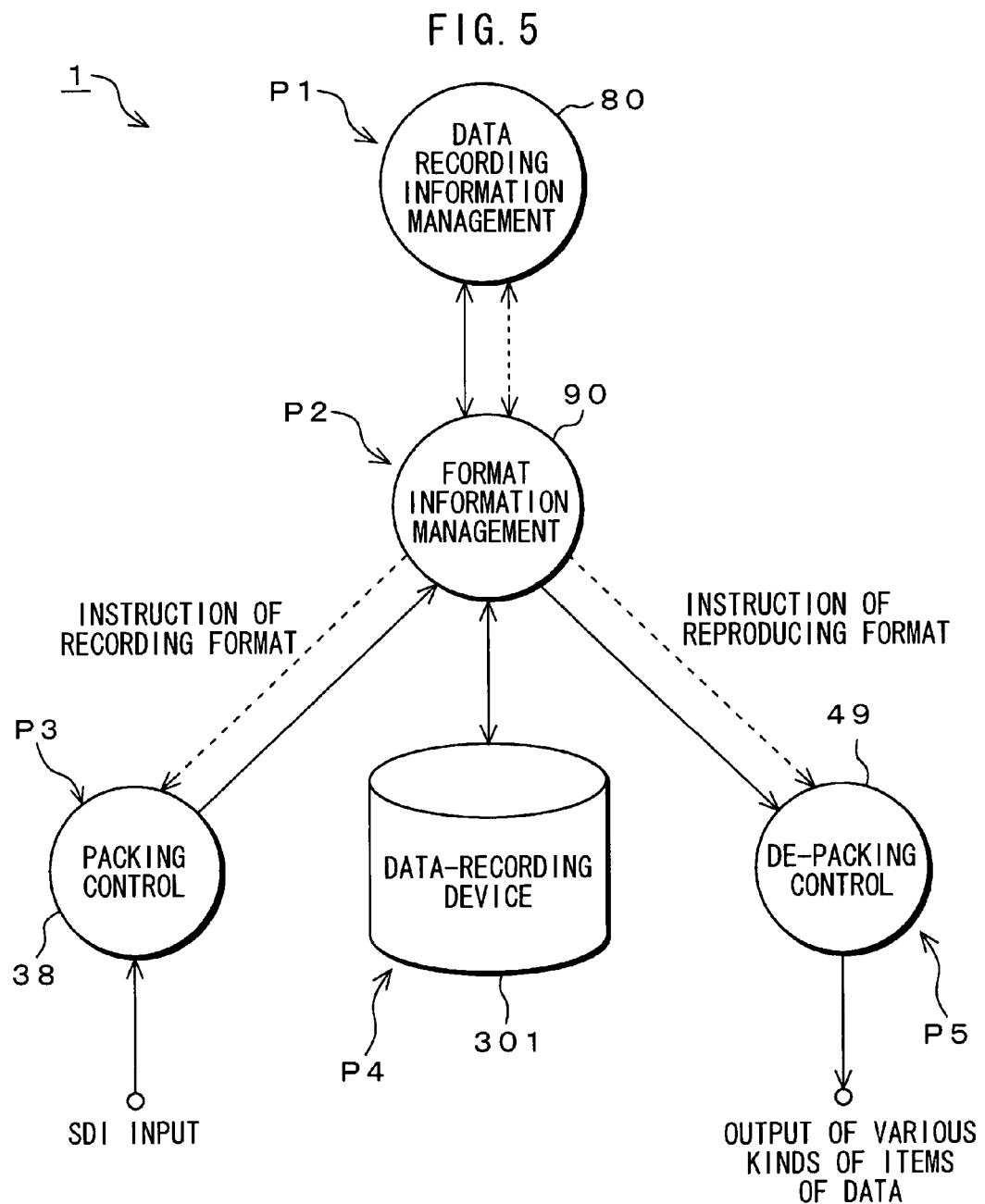
FIG. 5 is a diagram for showing an example of charged control during packing or de-packing.

FIG. 5 shows an example of charged controls during packing or de-packing of multi-format in the AV server system 1. It is to be noted that, in FIG. 5, solid lines indicate live data and dotted lines indicate any controls of CPUs.

According to the example of charged controls shown in FIG. 5, at a position P1, FM personal computer 80 performs any data recording information management. At a position P2, the FM personal computer 80 is connected to the Net IF personal computer 90 that manages any format information. Under the control of the Net IF personal computer 90, the ENC sub CPU 38 is positioned at a position P3; the RAID 301 is positioned at a position P4; and the DEC sub CPU 49 is positioned at a position P5.

At the position P3, when recording the data, the ENC sub CPU 38 receives any instructions of the recording format from the Net IF personal computer 90 to perform any packing control. At the position P3, under the packing control thereof, the ENC sub CPU 38 receives any designation of empty data file body with a desired data format from plural empty data file bodies each in which a header pack region corresponding to various kinds of data formats and a data pack region are assigned, selects the empty file body DBi, and loads any data and header information that is added to the data on predetermined regions assigned in the selected empty data file body. Packed data is transferred to an address in RAID 301 designated by the FM personal computer 80. At a position P4, RAID 301 stores an AV data stream in the address designated by the FM personal computer 80.

When reproducing the data, the FM personal computer 80 and the Net IF personal computer 90 instruct a reproducing format to the DEC sub CPU 49 positioned at the position P5, at the position P1 and the position P2, respectively. The DEC sub CPU 49 also receives any instruction of a reproducing format from the FM personal computer 80 or the Net IF personal computer 90 to read the AV data stream out of the address in the RAID 301. The DEC sub CPU 49 performs de-packing control.

At the position P5, RAID 301 reads a data stream with a predetermined data format to the bank memory 14 under the packing control of the DEC sub CPU 49. The data stream is spread in the mini bank memory 39. An empty data file body with a data format corresponding to a data file body that fills the data stream thus spread therein is selected. The data file body that fills the data stream thus spread is compared with the selected empty data file body to search the header pack region and the data pack region. The header information is taken out of the header pack region of the data file body that fills the data stream and the data is taken out of the data pack region. The data thus taken out is de-packed and outputted to a data demand system of the network that manages any data with a general purpose format or a data demand system for a non-general purpose format such as broadcast equipment or information distributor for audio and/or video.

The following will describe embodiments of pack/de-pack processing in the data recording/reproducing device 101. First, the pack processing will be described as a first embodiment.

The ENC substrate 31 shown in FIG. 6 performs hardware-encoding (hereinafter referred to as "ENC processing") on a base band of SDI data received from the broadcast equipment or the information distributor for audio and/or video with a format indicated by software or performs pack processing on AV data obtained by the ENC processing under any control of software to produce data with any various kinds of formats. Herein, the pack processing relates to processing that converts a non-general format of any received AV data or the like into a predetermined recording data format equipped with the ENC substrate 31.

When extending the recording data format, information on the file header and file footer is transferred to and held in the FM personal computer 80 via the main CPU 23. When data is received and transmitted through the Net IF personal computer 90, the Net IF personal computer 90 adds or deletes the file header, file footer and the like, relative to the recording data format, based on any file information from the FM personal computer 80.

In this embodiment, any data format conversion can be implemented by rearranging video data Dv, audio data Da, meta/NCMP data Dmp, time code Tc and the like. The data formats to be converted are MXF format (only file body) and AVI format (only file body). The AV data stream packed to various kinds of formats is spread in the bank memory 14 and then stored in RAID 301.

Figure 6:
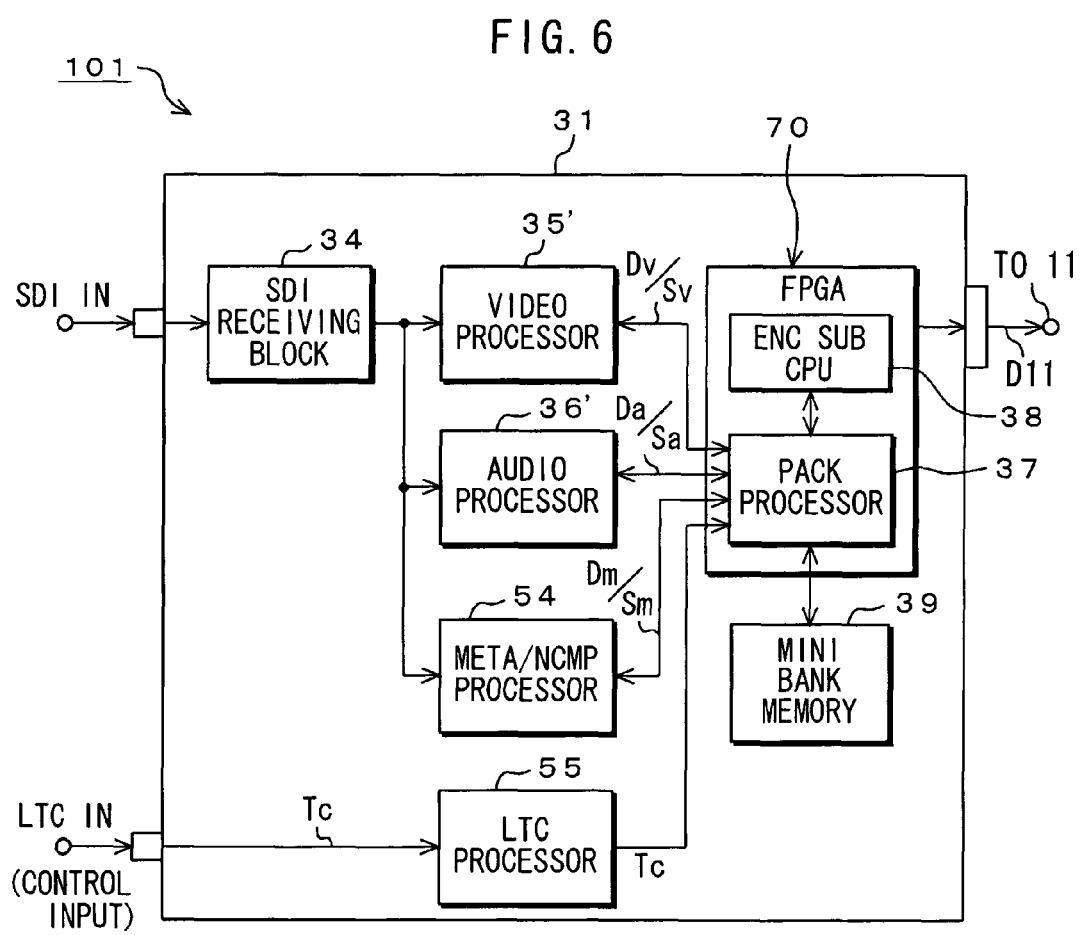
FIG. 6 is a block diagram for showing a configuration of a first embodiment of ENC substrate.

In FIG. 6, the ENC substrate 31 has an SDI receiving block 34, a video processor (MPEG encoder) 35', an audio processor 36', a mini bank memory 39, a meta/NCMP processor 54, an LTC processor 55, and a pack block 70.

The SDI receiving block 34 receives SDI data (SDIin) from broadcast equipment or audio and/or video distributor. The SDI data is audio and/or video data (signal) in which 30 images display for one second by NTSC scheme or 25 images display for one second by PAL scheme. The SDI receiving block 34 separates from the SDI data the video data Dv, the audio data Da, and the meta/NCMP data Dmp. The SDI receiving block 34 is connected to the video processor 35', the audio processor 36', the meta/NCMP processor 54, and the LTC processor 55.

The video processor 35' receives the video data Dv from the SDI receiving block 34 and codes and compresses the video data Dv based on MPEG standard or the like. The MPEG encoder 35 or the like is used as the video processor 35'. The coded and compressed video data stream (hereinafter referred to as "video data") is read based on a read control signal Sv from a pack processor 37.

The audio processor 36' receives audio data Da from the SDI receiving block 34 and performs audio processing on the audio data Da based on JPEG standard or the like. Audio data stream (hereinafter referred to as "audio data") obtained by the audio processing is read out based on a read control signal Sa from the pack processor 37. The audio processor 36' constitutes the audio block 36.

The meta/NCMP processor 54 receives metadata and uncompressed data (NCMP) from the SDI receiving block 34 and performs data processing on them. The metadata and NCMP data (meta/NCMP data) thus processed is read out based on a read control signal Sm from the pack processor 37. The LTC processor 55 performs data processing on local time code Tc received from the control terminal 200, the FM personal computer 80, or the Net IF personal computer 90, which have upper hierarch. The time code Tc is read to the pack processor 37.

The pack block 70 has the pack processor 37 and an ENC sub CPU 38. The pack processor 37 is functional block in which items of data are efficiently rearranged based on an instruction of the ENC sub CPU 38 and packing such that the header information and the AV data stream can be combined is performed.

To the pack processor 37, the mini bank memory 39 as an example of the memory portion is connected. The mini bank memory 39 stores plural species of empty data file bodies each in which additional information corresponding to various kinds of data formats and data are assigned to an additional information loading region (hereinafter referred to as "header pack region") and a data loading region (hereinafter referred to as "data pack region"). The mini bank memory 39 is used so that items of base band data such as the video data Dv, the audio data Da, the meta/NCMP data Dmp and time code TC can be rearranged. The general-purpose memory such as RAM is used as the mini bank memory 39. Since it is necessary for the mini bank memory 39 to have volume of at least 470 kilo bytes, the mini bank memory 39 might have volume of about 500 kilo bytes. For example, the mini bank memory 39 stores data of two frames.

To the pack processor 37, the ENC sub CPU 38 is also connected. The ENC sub CPU 38 controls the mini bank memory 39 constituted of two banks to switch writing and reading for every frame. The ENC sub CPU 38 is called for "Nios" and is a software-CPU core equipped with FPGA made of Altera Comp. Such ENC sub CPU 38 constituted of the software-CPU core allows data rearrangement to be implemented by software for packing corresponding to various kinds of data formats if taking any future extension into consideration.

Figure 7:
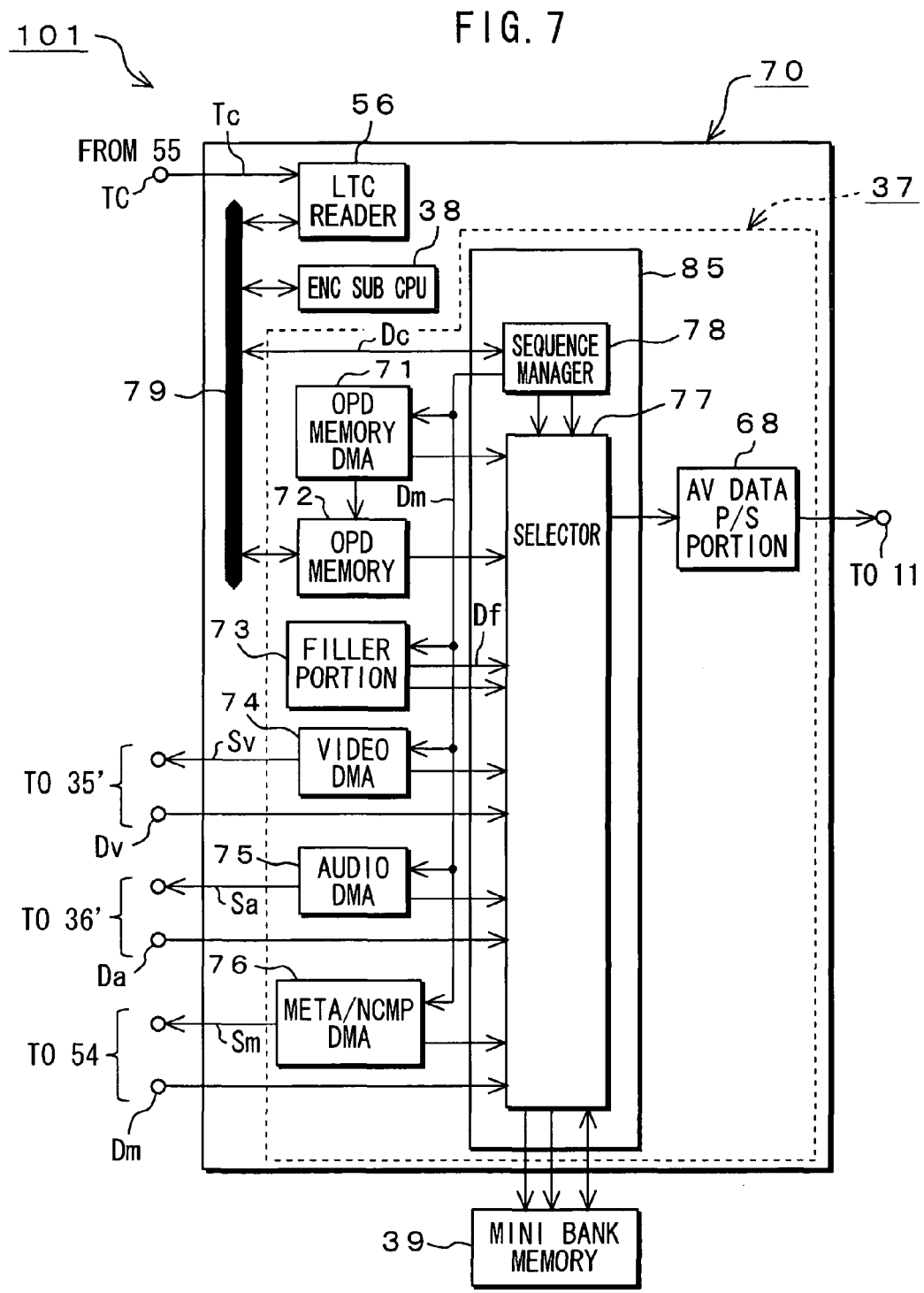
FIG. 7 is a block diagram for showing a configuration of pack processor and its periphery in a pack block.

FIG. 7 shows a configuration of the pack processor 37 and its periphery in the pack block 70.

The pack processor 37 within the pack block (FPGA) 70 has a direct memory access portion (hereinafter referred to as "OPD memory DMA 71") for optional data memory, a memory for optional data (hereinafter referred to as "OPD memory 72"), a filler portion 73, a video DMA 74, an audio DMA 75, a meta/NCMP DMA 76, a DMA manager 85, and an AV data P/S portion 68.

In a periphery of the pack processor 37, the ENC sub CPU 38 and a LTC (local time code) read portion 56 are arranged. The ENC subCPU 38 transmits control communication data Dc to a sequence manager 78. The LTC read portion 56 acquires any information on a local time code (hereinafter referred to as "LTC") of AV data received from the bank memory 14. This information is read out of the ENC sub CPU 38. The LTC read portion 56 is connected with the ENC sub CPU 38 and the DMA manager 85 through a CPU bus 79.

To the above CPU bus 79, the OPD memory DMA 71 is connected. The OPD memory DMA 71 receives any read address, any write address, and a parameter of length of data and fixes read region of the OPD memory 72 and write region of the mini bank memory 39.

To the OPD memory DMA 71, the OPD memory 72 and the DMA manager 85 are connected. This allows the ENC sub CPU 38 to be read and written and optional data written in the OPD memory 72 to be transferred to the mini bank memory 39 through the OPD memory DMA 71. The OPD memory 72 stores Keys for various kinds of items suited for recording data formats, a length of data (Length), System Item, Body Partition, Index Table and the like. Since it is necessary for the OPD memory 72 to have volume (memory size) of at least 4883 bytes, the OPD memory 72 might have volume of about 5000 bytes.

The OPD memory 72 is connected to the selector 77 that reads any data out of a designated region of the OPD memory 72 and writes the data into the mini bank memory 39, based on a start trigger signal from the DMA manager 85. Such the writing of data finishes or restarts for units of frames. The address is byte address and the length of data has byte unit.

The filler portion 73 is connected with the DMA manager 85 and receives a fixed value (one byte) of the filler data, a write address, and a parameter of the length of data from the sequence manager 78 as well as fixes filler data style (for example, 0X00 and 0XFF) and a write region of the mini bank memory 39. The filler portion 73 transmits filler data Df based on the DMA control data Dm. for example, the filler portion 73 is connected to the selector 77 and writes the indicated filler data into the mini bank memory 39 based on a start trigger signal from the DMA manager 85. Such the writing of data finishes or restarts for units of frames. The address is byte address and the length of data has byte unit.

The video DMA 74 receives a video format, a write address, and a parameter of length of data from the DMA manager 85 and fixes video processor 35' for taking out the video data Dv and a write region of the mini bank memory 39. For example, the video DMA 74 transmits a read control signal Sv to the video processor 35' based on the DMA control data Dm. The video DMA 74 is connected to the selector 77 and reads video data Dv out of the fixed video processor (MPEG encoder) 35' based on a start trigger from the DMA manager 85, and writes the video data Dv into the mini bank memory 39. Such the writing of data finishes or restarts for units of frames. The address is byte address and the length of data has byte unit.

The audio DMA 75 receives a write address and a parameter of length of data from the DMA manager 85 and fixes a write region of the mini bank memory 39. The audio DMA 75 is connected to the selector 77. For example, the audio DMA 75 transmits a read control signal Sa to the audio processor 36' based on the DMA control data Dm. The audio DMA 75 reads audio data Da with an indicated format out of the audio processor based on a start trigger from the DMA manager 85, and writes the audio data Da into the mini bank memory 39. Such the writing of data finishes or restarts for units of frames. The address is byte address and the length of data has byte unit.

The meta/NCMP DMA 76 receives data type (UMID, Essence Mark, ARIB, NCMP line number), a write address and a parameter of length of data from the DMA manager 85 and fixes data (UMID, Essence Mark, ARIB, NCMP data of indicated line) to be taken out of the meta/NCMP processor 54 and a write region of the mini bank memory 39. For example, the meta/NCMP DMA 76 transmits a read control signal Sm to the meta/NCMP processor 54 based on the DMA control data Dm. The meta/NCMP DMA 76 is connected to the selector 77 and reads meta/NCMP data Dmp out of the fixed meta/NCMP processor 54 based on a start trigger from the DMA manager 85 as well as writes the data Dmp into the mini bank memory 39. Such the writing of data finishes or restarts for units of frames. The address is byte address and the length of data has byte unit.

In this embodiment, when taking out the data from the meta/NCMP processor 54, various kinds of data are separately taken out. The NCMP data is designated for units of line number. The address is byte address and the length of data has byte unit. Sizes of items of metadata (UMID) may be different from each other according to SDI inputs so that the items of metadata are transferred after their lengths of data have been set.

The DMA manager 85 manages various DMAs 71, 74, 75, and 76 to control heir operations. The DMA manager 85 has the selector 77 and the sequence manager 78. The sequence manager 78 transmits MDA control data Dm to each of the various DMAs 71, 74, 75, and 76 and the filler portion 73 to control them.

The selector 77 constitutes the selection portion. The selector 77 selects an empty data file body with a specified data format from the plural species of empty data file bodies that are stored in the mini bank memory 39. The selector 77 also selects the data to be read by the various DMAs 71, 74, 75, and 76 and a write control signal to the mini bank memory 39 to write various kinds of data in the mini bank memory 39.

The selector 77 is connected to the sequence manager 78 that constitutes the information-loading portion. The sequence manager 78 performs data management such that the header information and the data are respectively loaded into predetermined loading regions assigned in the empty data file body that has been selected by the selector 77. For example, the sequence manager 78 performs time-division processing on timing for writing data into the mini bank memory 39 and controls operations of the various DMAs 71, 74, 75, and 76. The sequence manager 78 controls the selector 77 corresponding to the operations of the various DMAs 71, 74, 75, and 76. In this embodiment, such the writing of data into the mini bank memory 39 finishes or restarts for units of frames.

The selector 77 is connected to the AV data P/S portion 68 that converts parallel AV data received by the pack processor 37 into serial AV data when recording the data. For example, the AV data P/S portion 68 converts packed data received by the pack processor 37 into data with an AV stream format. When reading the packed data out of the mini bank memory 39, a data size is set in the AV data P/S portion 68 and the AV data P/S portion 68 transmits a request corresponding to the data size to the pack processor 37 and takes out the packed data therefrom. The AV data thus serialized is transferred to the FC input/output substrate 11. The AV data P/S portion 68 designates an area in the bank memory to be written and a size of the transferred data.

Figure 8A:
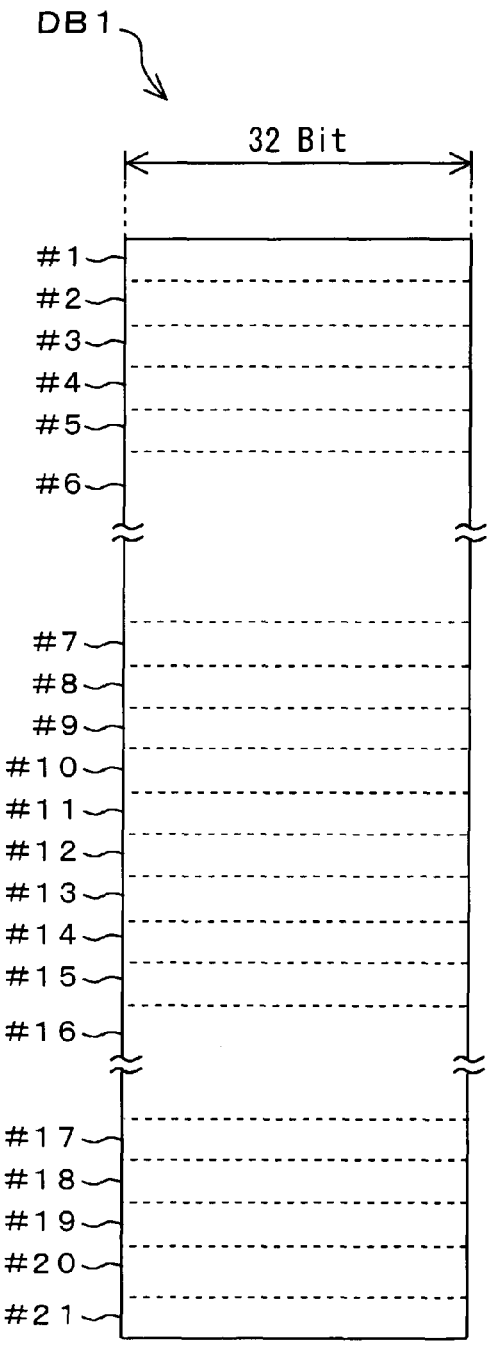
FIGS. 8A and 8B are diagrams each for showing configurations of an empty data file body and packed data in a mini bank memory.
Figure 8B:
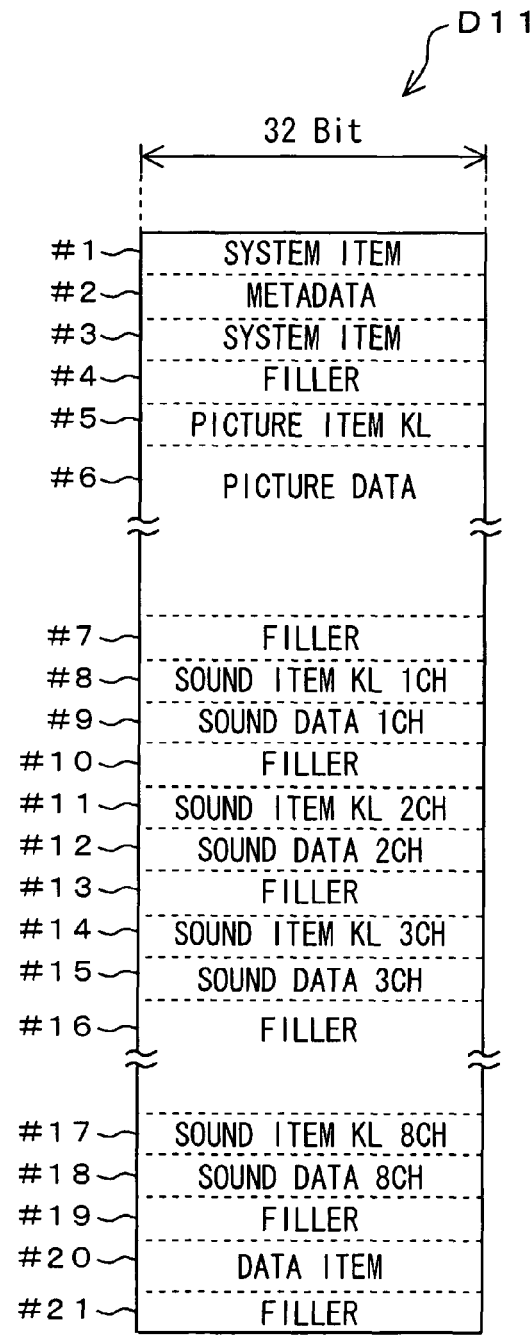

FIGS. 8A and 8B show configurations of an empty data file body and packed data in the mini bank memory 39.

In this embodiment, a recording data format structure of the packed data is similar to a data format structure of the data that is stored in RAID 301 and corresponds to at least two species of data formats, MXF format and AVI format. The recording data format is configured so that it can deal with a case where the data format will be extended in a future. Only the body of data file with each format is produced as packed data and then, the packed data is stored in RAID 301.

According to a structure shown in FIG. 8A, the empty data file body DB1 for MXF-1 CH mode (MPEG long DV) is spread in the mini bank memory 39. Pack regions #1 through #21 for loading System Item, Metadata, System Item, Filler, Picture Item KL, Picture (Video) data, Filler, Sound (Audio) Item KL 1CH, Sound Data 1CH, Filler, Sound Item KL 2CH, Sound Data 2CH, Filler, Sound Item KL 3CH, Sound Data 3CH, Filler, . . . Sound Item KL 8CH, Sound Data 8CH, Filler, Data Item KL, VBI data & ARIB data, Filler, and the like are previously established (regulated) in the empty data file body DB1.

According to a structure of the rearranged data shown in FIG. 8B, the pack region #1 loads System Item; the pack region #2 loads Metadata; the pack region #3 loads System Item; the pack region #4 loads Filler; the pack region #5 loads Picture Item KL; the pack region #6 loads Picture Data; the pack region #7 loads Filler; the pack region #8 loads Sound (Audio) Item KL 1Ch; the pack region #9 loads Sound Data 1CH; the pack region #10 loads Filler; the pack region #11 loads Sound Item KL 2Ch; the pack region #12 loads Sound Data 2CH; the pack region #13 loads Filler; the pack region #14 loads Sound Item KL 3Ch; the pack region #15 loads Sound Data 3CH; the pack region #16 loads Filler; . . . ; the pack region #17 loads Sound Item KL 8Ch; the pack region #18 loads Sound Data 8CH; the pack region #19 loads Filler; the pack region #20 loads Data Item KL; and the pack region #21 loads Filler. This allows packed data D11 in MXF-1CH mode (MPEG long DV) to be configured.

Regarding a writing size of the empty data file body DB1 for MXF-1CH mode excluding AV data, a memory region having a total of 4883 bytes of a body partition of 160 bytes; Index Table of 4138 bytes; and Generic Container of 585 bytes is generated in the OPD memory 72 in the pack processor 37.

Lengths of data of Filler are different from each other so that the OPD memory 72 writes and holds any filler information. User data in System Item describes time code Tc to rewrite it for each frame. Data sizes of Picture Data alter for each frame so that a length of data of Picture Item is rewritten for each frame.

Similarly, a length of data of Filler relative to Picture Item also alters so that it can be rewritten for each frame. Since numbers of the uncompressed line data (NCMP data) relative to Data Item can alter according to any menu setting, any processing is performed based on the altered numbers. If a position of NCMP data relative to Data Item is added by the NCMP processor side, a pointer can be omitted.

Figure 9A:
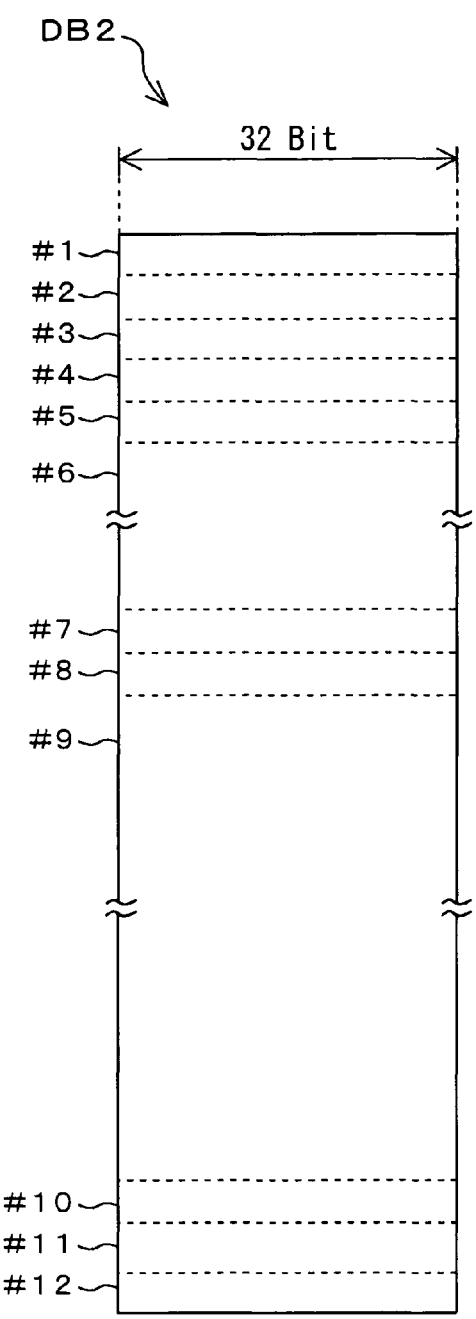
FIGS. 9A and 9B are diagrams each for showing configurations of an empty data file body and packed data in a mini bank memory.
Figure 9B:
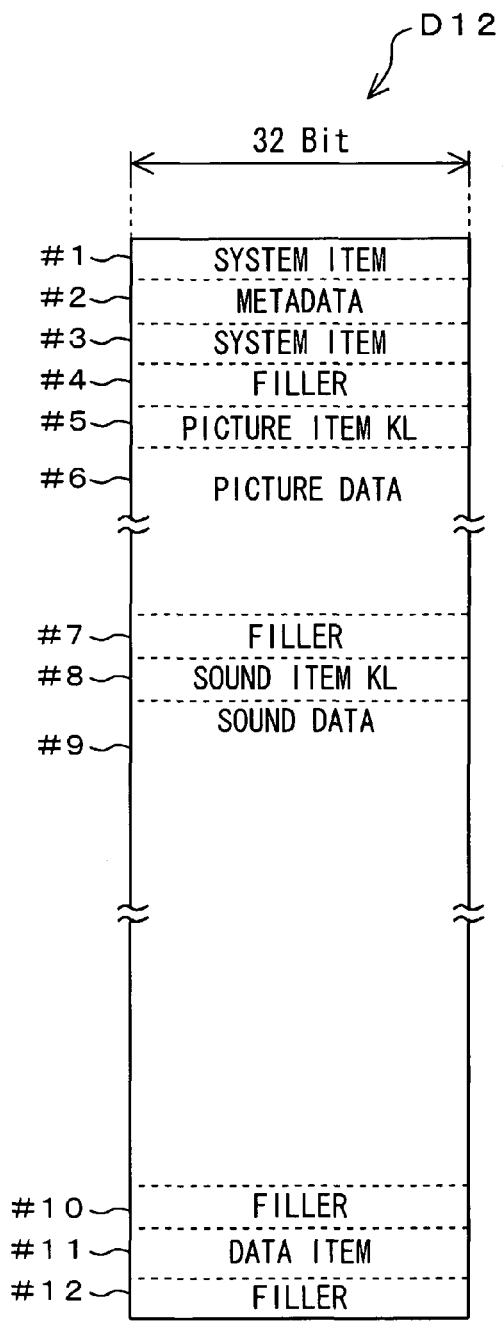

FIGS. 9A and 9B show other configurations of an empty data file body and packed data in the mini bank memory 39.

According to a structure shown in FIG. 9A, the empty data file body DB2 for MXF 8 CH AES 3 mode (IMX) is spread in the mini bank memory 39. Pack regions #1 through #12 for loading System Item, Metadata, System Item, Filler, Picture Item KL, Picture (Video) data, Filler, Sound (Audio) Item KL, Sound Data, Filler, Data Item KL, Filler, and the like are previously established (regulated) in the empty data file body DB2.

According to a structure of the rearranged data shown in FIG. 9B, the pack region #1 loads System Item; the pack region #2 loads Metadata; the pack region #3 loads System Item; the pack region #4 loads Filler; the pack region #5 loads Picture Item KL; the pack region #6 loads Picture (video) Data; the pack region #7 loads Filler; the pack region #8 loads Sound (Audio) Item KL; the pack region #9 loads Sound Data; the pack region #10 loads Filler; the pack region #11 loads Data Item KL; and the pack region #21 loads Filler. This allows packed data D12 in MXF 8CH AES 3 mode to be configured.

Regarding a writing size of the empty data file body DB2 for MXF 8CH AES 3 mode excluding AV data, a memory region having a total of 4603 bytes of a body partition of 160 bytes; Index Table of 4138 bytes; and Generic Container of 305 bytes is generated in the OPD memory 72 in the pack processor 37. Since keys of Filler and lengths of data in Sound Items of each channel are identical, a pointer can be omitted.

The following will describe various kinds of data flows in the pack processing and operations of functional blocks. FIGS. 10A through 10D show a selection example of the empty data file body DB1 and pack processing therefor.

In this embodiment, one empty data file body DBi can be selected from n species of empty data file bodies DB1 to DBn. For example, the selector 77' selects one empty data file body DBi from n species of empty data file bodies DB1 to DBn, shown in FIG. 10A, that are stored in the mini bank memory 39. The selection is instructed with, for example, the main CPU 23 through the ENC sub CPU 38.

The empty data file body DBi thus selected is spread in the mini bank memory 39. The mini bank memory 39 is connected to, for example, m pieces of resistors Ri (i=1 to m) for setting write data, which correspond to each of the pack regions. For example, the resistor R1 sets data relative to System Item. The data set in the resistor R1 is written to the pack region #1 spread in the mini bank memory 39. This allows System Item to be loaded into the region #1.

Similarly, the resistor R2 sets Metadata. The Metadata set in the resistor R2 is written to the pack region #2 spread in the mini bank memory 39. This allows Metadata to be loaded into the region #2. Further, when the resistor R5 sets data relative to Picture Item KL, the data set in the resistor R5 is written to the pack region #5 spread in the mini bank memory 39. This allows Picture Item KL to be loaded into the region #5.

Figure 11:
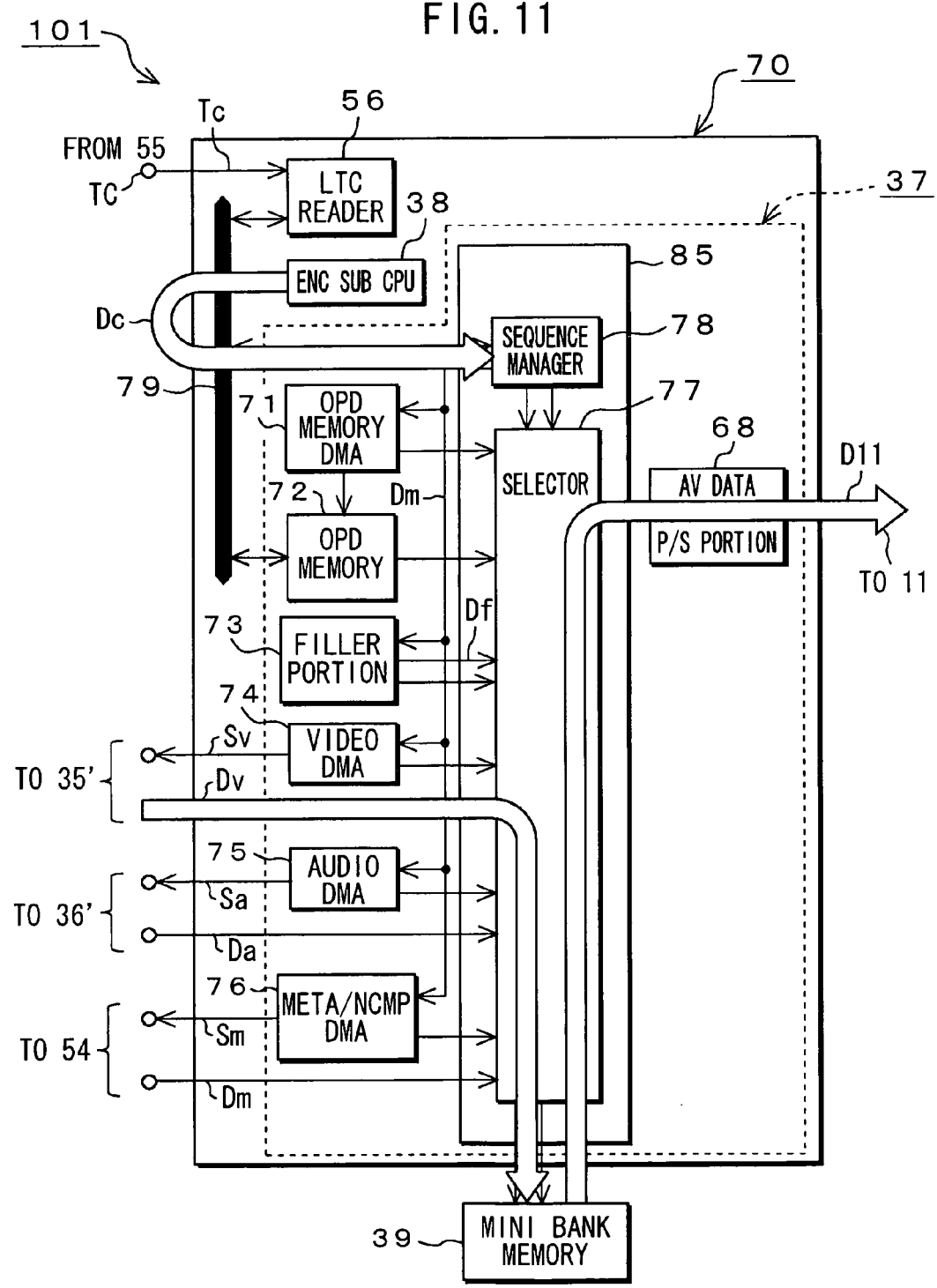
FIG. 11 is a diagram for showing an example of pack processing on video data.

FIG. 11 shows an example of pack processing on the video data Dv. If performing the pack processing on the video data Dv, data flows as arrows shown in FIG. 11. First, the ENC sub CPU 38 controls the sequence manager 78 in the DMA manager 85 to set a value corresponding to a format to the resistor Ri for video format from n pieces of registers shown in FIG. 10D. In this case, the ENC sub CPU 38 transmits control communication data Dc such as the format set value to the sequence manager 78. Next, the sequence manager 78 receives the control communication data Dc from the ENC sub CPU 38 and sets a top address of a region, which is used for filling the video data Dv in the register Rj for write address, in the mini bank memory 39.

The sequence manager 78 then sets a data size of one frame acquired from the video processor 35' as the data size of next frame to the resistor Rk for the length of data. Next, the sequence manager 78 takes out the video data of one frame from the MPEG encoder 35 designated by the video processor 35' with matching the DMA information set in this frame and transmits (flows) it into the pack block 70. In this case, the video DMA 74 transmits a read control signal Sv to the video processor 35'.

In the pack block 70, the video data Dv of one frame taken out from the MPEG encoder 35 is written into the mini bank memory 39 through the selector 77 based on, for example, the read control signal Sv. The pack block 70 reads the packed data D11 out of the mini bank memory 39, at next frame, based on a request from AV data P/S portion 68 and transmits the packed data D11 to the bank memory 14 in the FC input/output substrate 11. This allows the packed video data Dv to be transmitted to the bank memory 14.

Figure 12:
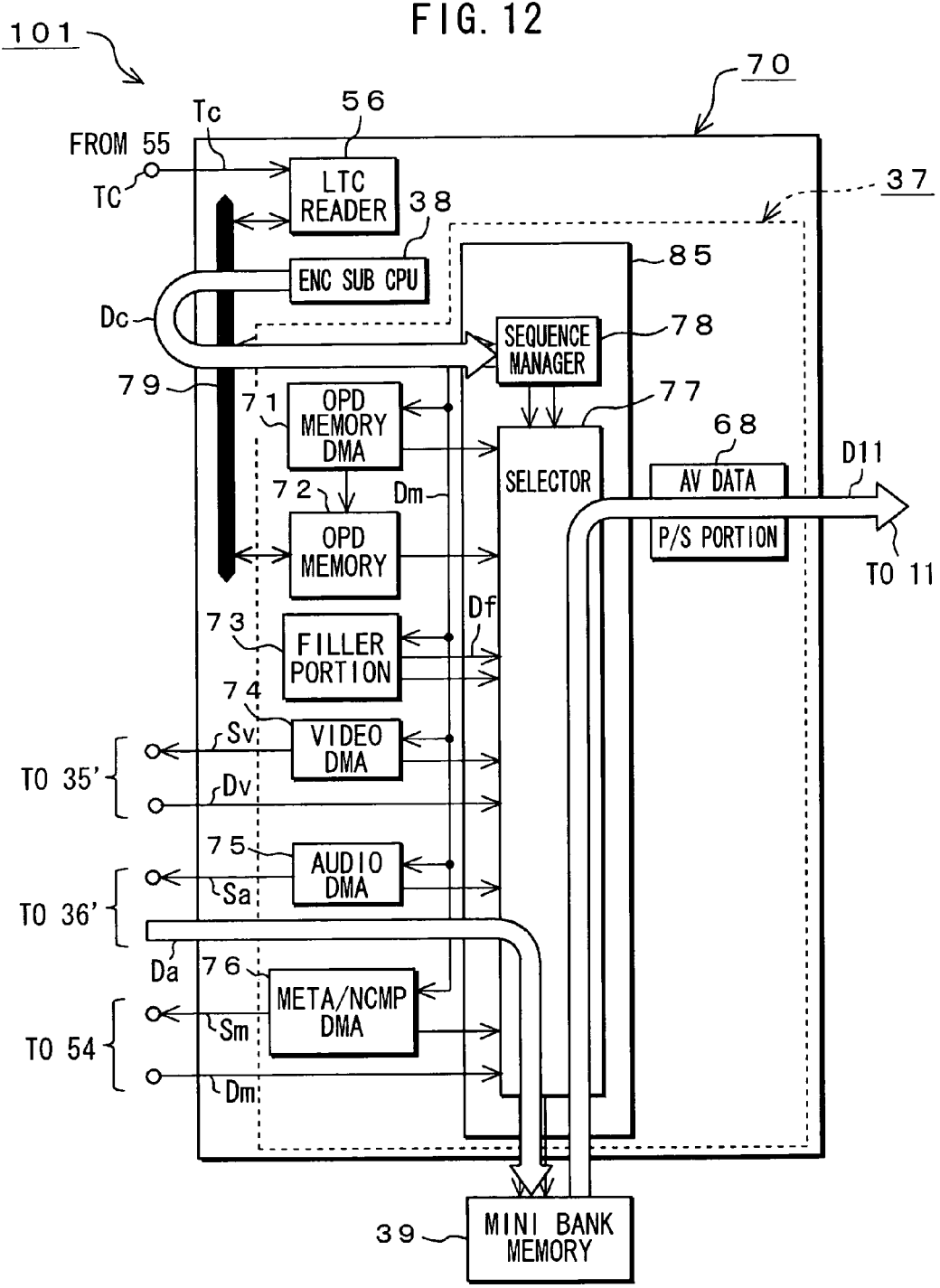
FIG. 12 is a diagram for showing an example of pack processing on audio data.

FIG. 12 shows an example of pack processing on the audio data Da. If performing the pack processing on the audio data Da, data flows as arrows shown in FIG. 12. First, the control system of upper hierarch controls the ENC sub CPU 38 at change of set-up menu so that the sequence manager 78 in the DMA manager 85 can set an audio format (1ch/8ch AES 3) to the audio processor 36, a length of data of audio bits and the like. In this case, the ENC sub CPU 38 transmits control communication data Dc such as the length of data of audio bits to the sequence manager 78.

The sequence manager 78 sets a top address of a region, which is used for filling the audio data Da in a register for write address-first action, which is not shown, in the mini bank memory 39 based on the control communication data Dc. Next, the sequence manager 78 calculates a size of audio data from data of five frames acquired by the audio processor 36' and sets it to the register for write address-first action. In this case, DMA manager 85 sets a data size of one channel in a case of MXF 1CH mode or sets a data size of eight channels in a case of 8ch AES 3 mode.

The sequence manager 78 then sets the above top address and data size of the audio data Da following to numbers of audio channels. In this embodiment, number, "0" is set to the register for a length of data after address of channel number and the length of data have been set. The sequence manager 78 sets number "0" to the registers for a length of data-second to eighth action in a case of 8ch AES 3 mode. In this case, the video DMA 74 transmits a read control signal Sa to the audio processor 36'.

Next, the ENC sub CPU 38 takes out the audio data Da from the audio processor 36' with matching the DMA information set in the next frame and transmits it into the pack block 70. In the pack block 70, the audio data Da of one frame taken out from the audio block 36 is written into the mini bank memory 39 through the selector 77 based on, for example, the read control signal Sa. The pack block 70 reads the packed data D11 out of the mini bank memory 39, at next frame, based on a request from AV data P/S portion 68 and transmits the packed data D11 to the bank memory 14 in the FC input/output substrate 11. This allows the packed audio data Da to be transmitted to the bank memory 14.

Figure 13:
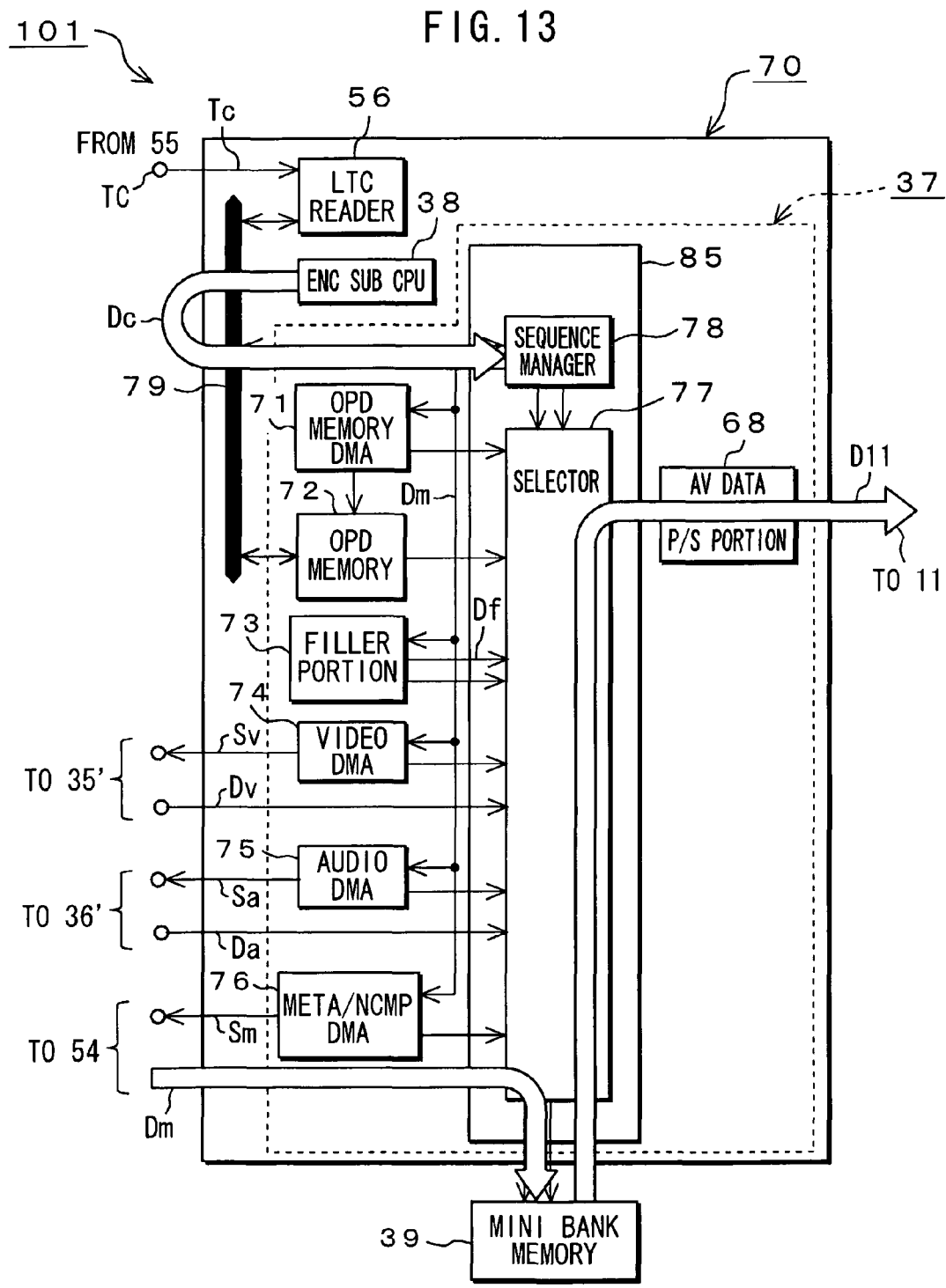
FIG. 13 is a diagram for showing an example of pack processing on metadata/NCMP data.

FIG. 13 shows an example of pack processing on meta/NCMP data Dmp. If performing the pack processing on the metadata/NCMP data Dmp, data flows as arrows shown in FIG. 13. First, the control system of upper hierarch controls the ENC sub CPU 38 at change of set-up menu so that the sequence manager 78 in the DMA manager 85 can set NCMP line to the meta/NCMP processor 54, an amount of delay and the like. In this case, the ENC sub CPU 38 transmits control communication data Dc such as the NCMP line to the meta/NCMP processor 54, the amount of delay and the like to the sequence manager 78.

The sequence manager 78 sets a species of the meta/NCMP data Dmp to be transferred to the mini bank memory 39 to a register for data type-first action based on the control communication data Dc. The sequence manager 78 then sets a top address of a region, which is used for filling the specified meta/NCMP data Dmp in a register for write address-first action, in the mini bank memory 39. Next, the sequence manager 78 sets a data size of the specified meta/NCMP data Dmp to the register for a length of data-first action. The ENC sub CPU 38 sets a species of data, an address, and a length of data by numbers of items of meta/NCMP data to DMA manager 85 with matching the set-up menu. In this embodiment, number, "0" is set to the register for a length of data after necessary address and length of data have been set. In this case, the meta/NCMP DMA 76 transmits a read control signal Sm to the meta/NCMP processor 54.

Next, the ENC sub CPU 38 takes out the specified meta/NCMP data Dmp from the meta/NCMP processor 54 with matching the DMA information set in the next frame and transmits (flows) it into the pack block 70. In the pack block 70, the specified meta/NCMP data Dmp taken out from, for example, the meta/NCMP processor 54 is written into the mini bank memory 39 through the selector 77. The pack processor 37 reads the packed data D11 out of the mini bank memory 39, at next frame, with matching a request from AV data P/S portion 68, based on the read control signal Sm and transmits the packed data D11 to the bank memory 14 in the FC input/output substrate 11. This allows the packed meta/NCMP data Dmp to be transmitted to the bank memory 14.

Figure 14:
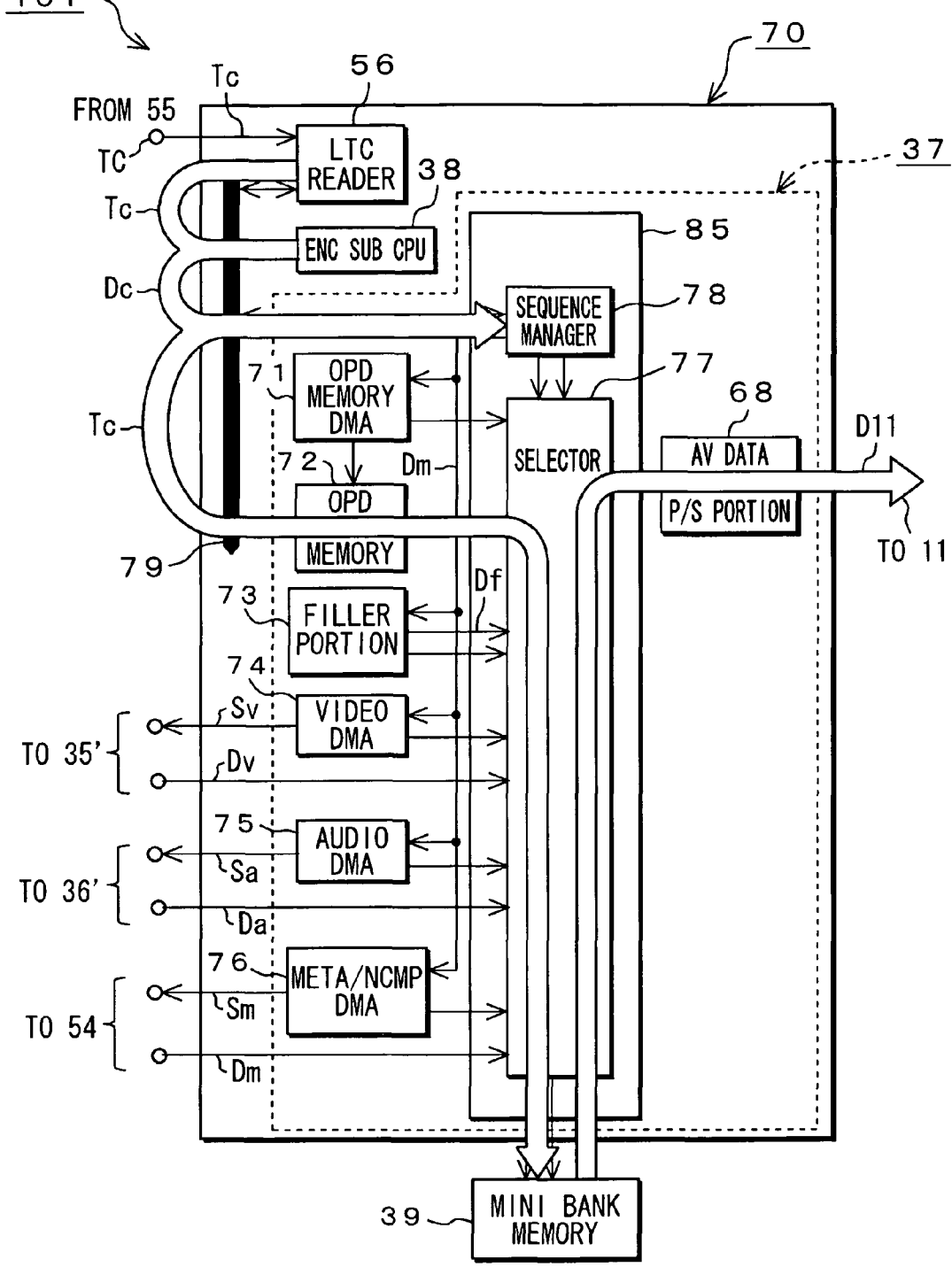
FIG. 14 is a diagram for showing an example of pack processing on time code.

FIG. 14 shows an example of pack processing on time code Tc. If performing the pack processing on the time code Tc, data flows as arrows shown in FIG. 14. First, the LTC reader 56 and a VITC reader (SUM), not shown, which are controlled by the control system of upper hierarch via the ENC sub CPU 38 read time code Tc of a time code generator (software), not shown, with matching the set-up menu. This is because the time code Tc is written to the OPD memory 72 with matching the recording data format. In this case, the ENC sub CPU 38 transmits control communication data Dc for read the time code Tc to the sequence manager 78.

In this embodiment, the time code Tc is transferred to the mini bank memory 30 together with System Item written in the OPD memory 72. In the moment, the sequence manager 78 then sets a top address of a region, which is used for transferring the data, in the OPD memory 72 based on the control communication data Dc. Next, the sequence manager 78 sets a top address of a region, which is used for filling transferred data in the OPD memory 72, in the mini bank memory 39 to the register, not shown, for a write address-first action. The sequence manager 78 then sets a length of data to be transferred to a register, not shown, for a length of data-first action.

The sequence manager 78 reads data (time code) out of a specified region of the OPD memory 72 at next frame. The data is written into the mini bank memory 39 through the selector 77. The pack processor 37 then reads data out of the mini bank memory 39, at next frame, with matching a request from AV data P/S portion 68 and transmits it to the bank memory 14 in the FC input/output substrate 11. This allows the packed time code Tc to be transmitted to the bank memory 14.

Figure 15:
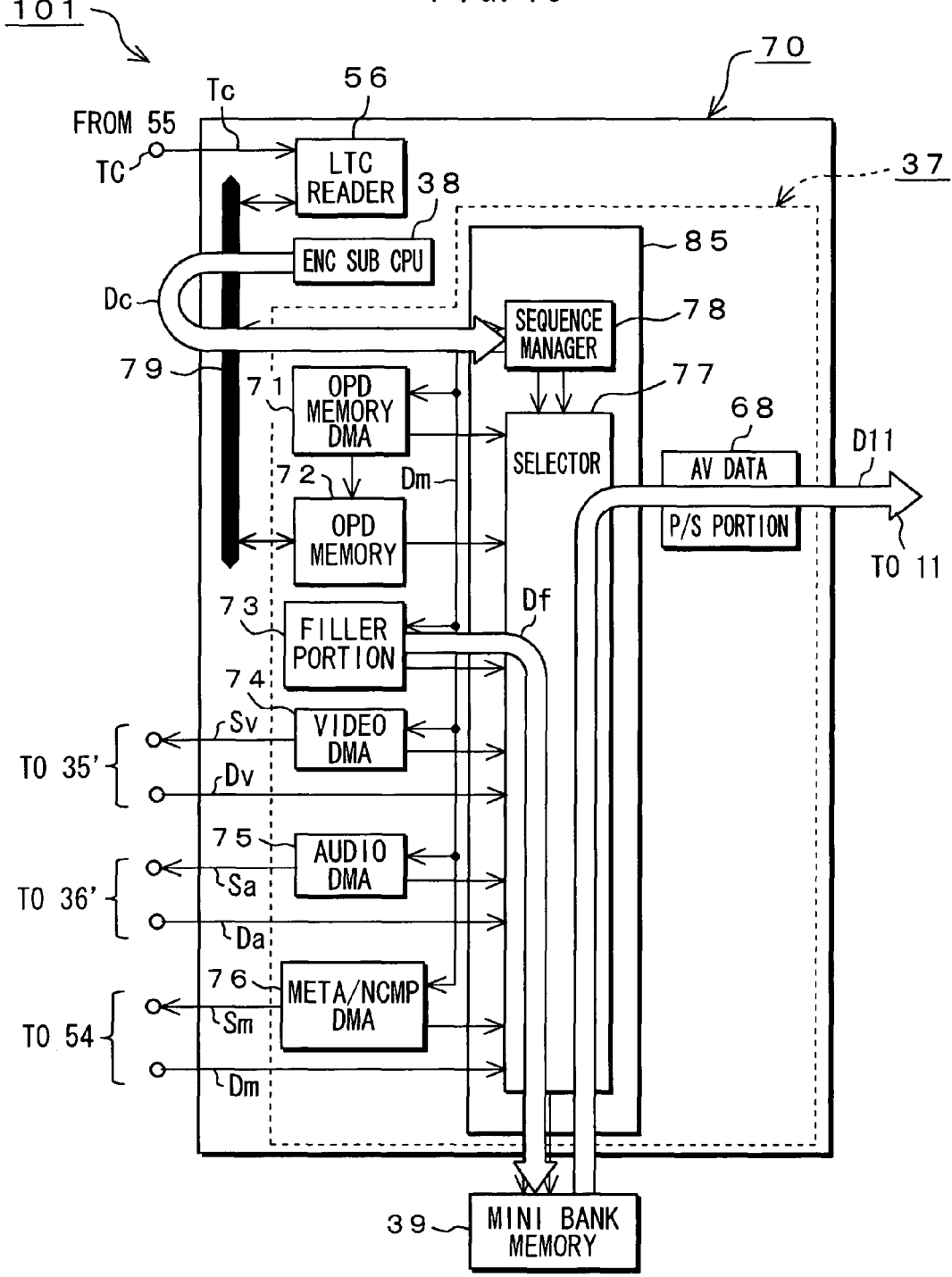
FIG. 15 is a diagram for showing an example of pack processing on filler data.

FIG. 15 shows an example of pack processing on filler data. If performing the pack processing on the filler data, data flows as arrows shown in FIG. 15. First, the sequence manager 78 in the DMA manager 85, which is controlled by the control system of upper hierarch via the ENC sub CPU 38, calculates a filler data size and a filler region in the mini bank memory 39 from the recording data format and a size of video data. In this case, the ENC sub CPU 38 transmits control communication data Dc for calculating the filler region to the sequence manager 78.

Next, the sequence manager 78 sets a top address of a region, which is used for filling the filler data, in the mini bank memory 39 to the register, not shown, for a write address-first action based on the control communication data Dc. The sequence manager 78 then sets a size of the specified filler data to the register, not shown, for a write address-first action. The sequence manager 78 performs setting of address and a length of data by numbers of items of the filler data with a recording data format. In this embodiment, number, "0" is set to the register for a length of data after necessary address and length of data have been set.

The ENC sub CPU 38 allows for transmitting the filler data from the filler portion 73 with matching the DMA information at next frame. The filler data transmitted from the filler portion 73 is written into the mini bank memory 39 through the selector 77. The pack processor 37 then reads data out of the mini bank memory 39, at next frame, with matching a request from AV data P/S portion 68 and transmits it to the bank memory 14 in the FC input/output substrate 11. This allows the packed filler data to be transmitted to the bank memory 14.

Figure 16:
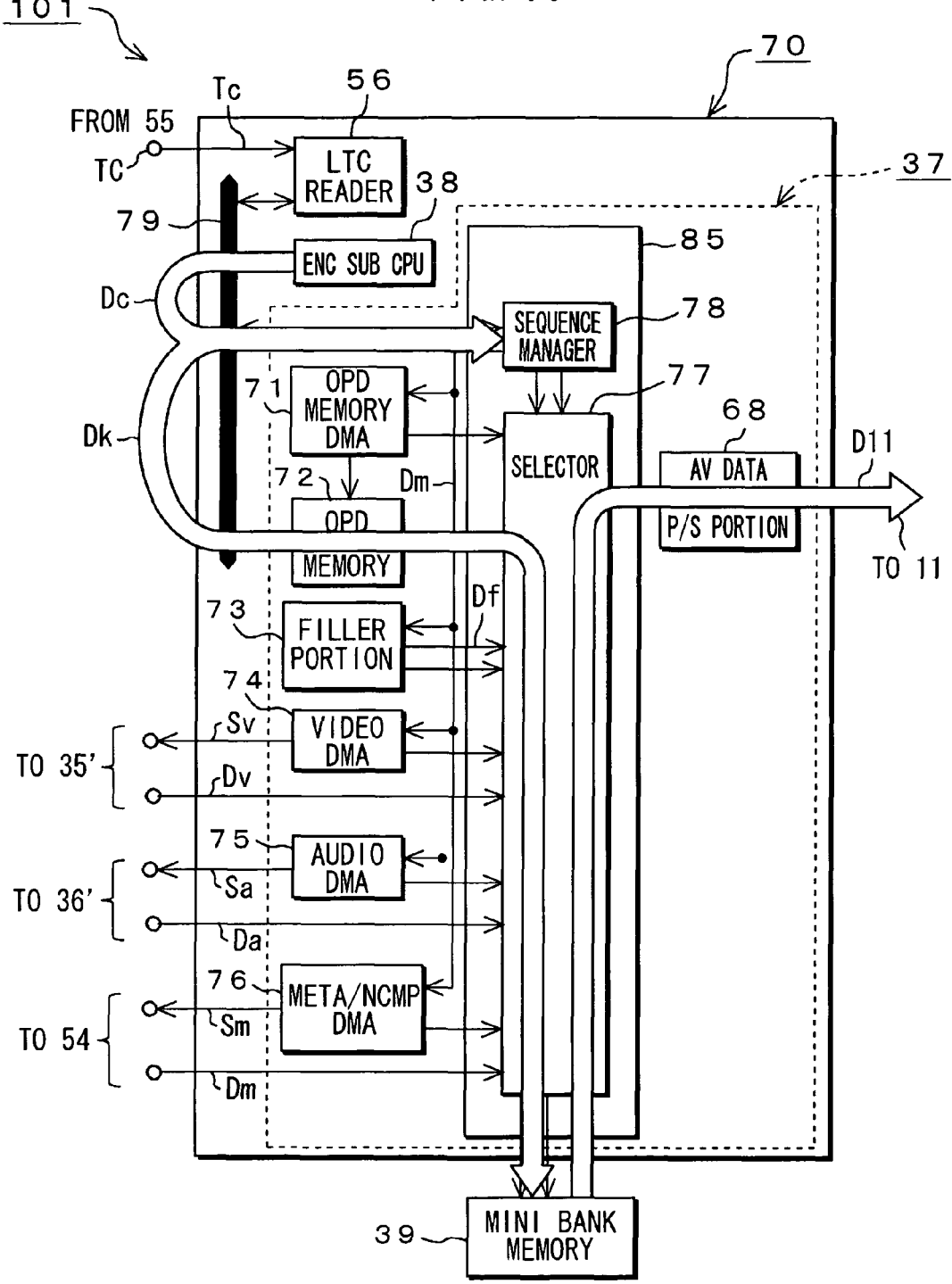
FIG. 16 is a diagram for showing an example of pack processing on data relative to a key and a length of data.

FIG. 16 shows an example of pack processing on data Dk relative to a key and a length of data. If performing the pack processing on the data Dk relative to the key and the length of data, data flows as arrows shown in FIG. 16. First, the sequence manager 78 in the DMA manager 85, which is controlled by the control system of upper hierarch via the ENC sub CPU 38, writes the data Dk relative to the key and the length of data in the OPD memory 72 with matching the recording data format. In this case, the ENC sub CPU 38 transmits control communication data Dc for writing the data Dk relative to the key and the length of data to the sequence manager 78.

Next, the sequence manager 78 sets a top address of a region, which is used for transferring the data, in the OPD memory 72 to the register, not shown, for a write address-first action based on the control communication data Dc. The sequence manager 78 then sets a top address of a region, which is used for storing the transferred data in the OPD memory 72 in the mini bank memory 39, in the mini bank memory 39 to the register, not shown, for a write address-first action. The sequence manager 78 performs setting of a data size to be transferred to the register for a write address-first action. The sequence manager 78 then performs setting of address and a length of data with matching the recording data format. In this embodiment, number, "0" is set to the register for a length of data after necessary address and length of data have been set.

The ENC sub CPU 38 allows for reading data from a specified region in the OPD memory 72 at next frame. The data read out of the specified region in the OPD memory 72 is written into the mini bank memory 39 through the selector 77. The pack processor 37 then reads data out of the mini bank memory 39, at next frame, with matching a request from AV data P/S portion 68 and transmits it to the bank memory 14 in the FC input/output substrate 11. This allows the data Dk relative to the key and the length of data to be transmitted to the bank memory 14.

FIG. 17 shows an example of pack processing in the data recording/reproducing device 101. It is to be noted that, in FIG. 17, solid lines indicate live data and dotted lines indicate any controls of CPUs.

At a position P11 shown in FIG. 17, the SDI receiving block 34 shown in FIG. 6 is positioned. Broadcast equipment receives the SDI data from any information distributor on audio and video and separates therefrom the video data Dv, the audio data Da, and the meta/NCMP data Dmp to extract them.

In an output stage of the SDI receiving block 34, at a position P12, the video processor 35' is positioned. The video processor acquires the video data Dv from the SSDI receiving block 34 and encodes it according to MPEG compression standard or the like to transmit it to a memory space for general purpose use such as the mini bank memory 39 and the bank memory 14, as shown in FIG. 11.

At a position P13, the audio processor 36' is positioned. The audio processor acquires the audio data Da from the SSDI receiving block 34 and processes the data Da to transmit it to a memory space for general purpose use such as the mini bank memory 39 and the bank memory 14, as shown in FIG. 12.

At a position P14, the meta/NCMP processor 54 is positioned. The meta/NCMP processor acquires the meta/NCMP data Dmp from the SSDI receiving block 34 and processes the data Dmp to transmit it to a memory space for general purpose use such as the mini bank memory 39 and the bank memory 14, as shown in FIG. 13.

At a position P15, the LTC processor 55 is positioned. The LTC processor acquires the time code Tc from the LTC reader 56 and processes the time code Tc to transmit it to a memory space for general purpose use such as the mini bank memory 39 and the bank memory 14, as shown in FIG. 14. In this memory space, the mini bank memory 39 previously stores plural species of empty data file bodies, DB1 to DBn, each in which the header pack region corresponding to a species of data formats and the data pack region are assigned.

At a position P16, the main CPU 23 and the ENC sub CPU 38 are positioned. They set address and an amount of data to the memory space for general purpose use positioned at a position P17. The main CPU 2 controls the Enc sub CPU 38 to so that the filler data shown in FIG. 15 and the data Dk relative to the key and the length of data shown in FIG. 16 can be processed and the processed ones are transmitted to the memory space for general purpose use such as the mini bank memory 39 and the bank memory 14. For example, the selector 77 selects an empty data file body DBi with a specified data format from the plural species of empty data file bodies, DB1 to DBn, that are stored in the mini bank memory 39.

Thus, according to the first embodiment of the AV server system 1, when recording the data, the selector 77 selects an empty data file body DBi with a specified data format from the plural species of empty data file bodies, DB1 to DBn, that are stored in the mini bank memory 39. The sequence manager 78 in the DMA manager 85 loads (packs) the header information and the AV data into predetermined loading regions assigned in the empty data file body DBi that has been selected by the selector 77.

This allows input data such as audio data and video data to be converted into any data stream with a desired data format with any software processing without depending on a size of hardware, thereby enabling a pack function in the input/output block of RAID 301 to have any redundancy. Thus, it is possible to present an AV server system having a pack function corresponding to multi-format.

FIGS. 18A through 18E show an example of de-pack processing as a second embodiment.

In this embodiment, when performing de-pack processing, the empty data file body DB1 and the like are searched. A filled data file body is then illustratively de-packed based on the empty data file body DB1 and the like.

In FIG. 18A, similar to a case of pack processing, one empty data file body DBi can be selected from n species of empty data file bodies DB1 to DBn. For example, the data stream with a predetermined data format is read out of RAID 301 to the mini bank memory 39' as shown in FIG. 18D via the bank memory 14.

In the mini bank memory 39', a file format of the corresponding data stream is searched. The search is performed in the mini bank memory 39' or the like so that a data file body that fills the data stream is compared with n species of empty data file bodies DB1 to DBn sequentially, and if corresponding to each other, the selector selects the corresponding one empty data file body DBi. In this case, the search is illustratively instructed with, for example, the main CPU 23 through the DEC sub CPU 49.

The empty data file body DBi thus selected is compared with the data file body that fills the data stream, which is transferred from the bank memory 14 and is spread in the mini bank memory 39', thereby searching the header pack region and the data pack region to extract the header information from the header pack region of the filled data file body and to extract the data from the data pack region in the filled data file body.

In the mini bank memory 39', for example, output ports for reading the data, which correspond to each of the pack regions, are provided in the de-pack block 44 (see m pieces of the registers Ri (i=1 to m) for data setting). For example, to the output port Q1, data relative to System Item is set. The data set in the output port Q1 is transmitted to the DEC sub CPU 49. This allows the DEC sub CPU 49 to detect System Item of the corresponding file format.

Similarly, to the output port Q2, Metadata is set. The Metadata set in the output port Q2 is transmitted to the DEC sub CPU 49. This allows the DEC sub CPU 49 to detect Metadata. Further, when the output port Q6 sets video data Dv, the video data Dv set in the output port Q6 is transmitted to the MPEG decoder 45. This allows the MPEG decoder 45 to decode the video data Dv (see FIG. 3).

FIG. 19 shows an example of de-pack processing in the data recording/reproducing device 101. It is to be noted that, in FIG. 19, solid lines indicate live data and dotted lines indicate any controls of CPUs.

At a position P21 shown in FIG. 19, the memory space for general purpose use such as RAID 301 shown in FIGS. 1 to 3, the bank memory 14, and the mini bank memory 39 is positioned. The AV data stream with a predetermined format is temporarily or perpetually stored in the memory space for general purpose use.

At a position P22, the FC sub CPU 16 and the de-pack block 44 shown in FIG. 3 are positioned. The FC sub CPU 16 reads the AV data stream with a predetermined format out of the memory space for general purpose use through the FC block 13. The de-pack block 44 acquires any information on address, a length of data, and an amount of data. the DEC sub CPU 49 performs de-pack processing based on these pieces of information.

For example, the data stream with a predetermined data format is read out of RAID 301 to the mini bank memory 39' as shown in FIG. 18D via the bank memory 14. In the mini bank memory 39', a file format of the corresponding data stream is searched. The search is performed in the mini bank memory 39' or the like so that a data file body that fills the data stream is compared with n species of empty data file bodies DB1 to DBn sequentially, and if corresponding to each other, the selector selects the corresponding one empty data file body DBi. In this case, the search is illustratively instructed with, for example, the main CPU 23 through the DEC sub CPU 49.

The empty data file body DBi thus selected is compared with the data file body that fills the data stream, which is transferred from the bank memory 14 and is spread in the mini bank memory 39', thereby searching the header pack region and the data pack region to extract the header information from the header pack region of the filled data file body and to extract the data from the data pack region in the filled data file body.

At a position P23, the LTC processor, not shown, is positioned. The LTC processor extracts the time code Tc from the AV data stream readout of the data pack region and then, the time code Tc is transmitted to the DEC sub CPU 49 and the like. The filler data and the data Dk relative to the key and the length of data are also processed and the processed ones are transmitted to DEC sub CPU 49 and the like.

At a position P24, the meta/NCMP processor, not shown, the jog memory 47, and SDI output block 48 are positioned. The meta/NCMP processor extracts and processes the meta/NCMP data Dmp and the processed meta/NCMP data Dmp is transmitted to the SDI output block 48 through the jog memory 47.

At a position P25, the audio block 46 is positioned. At the position P25, both of the above jog memory 47 and the SDI output block 48 are used. The audio block 46 processes the audio data Da and then, the processed audio data Da is transmitted to the SDI output block 48 through the jog memory 47.

At a position P26, the MPEG decoder 45 is positioned. At the position P26, both of the above jog memory 47 and the SDI output block 48 are used. The MPEG decoder 45 decodes the AV data stream and then, the video data Dv obtained by decoding the AV data stream is transmitted to the SDI output block 48 through the jog memory 47. This allows the AV data stream with multi-format to be de-packed.

Thus, according to the second embodiment of the AV server system 1, when reproducing the data, in the mini bank memory 39', a data file body that fills the data stream is compared with n species of empty data file bodies DB1 to DBn sequentially, if de-packing the data stream with a predetermined data format, which is read out of RAID 301 through the bank memory 14. If corresponding to each other, the selector 77' selects the corresponding one empty data file body DBi. The empty data file body DBi thus selected is compared with the data file body that fills the data stream, which is transferred from the bank memory 14 and is spread in the mini bank memory 39', thereby searching the header pack region and the data pack region to extract the header information from the header pack region of the filled data file body and to extract the data from the data pack region in the filled data file body.

This allows data stream with a predetermined data format to be converted into any SDI data such as audio data and video data with any software processing without depending on a size of hardware, thereby enabling a de-pack function in the input/output block of RAID 301 to have any redundancy. Thus, it is possible to present an AV server system having a de-pack function corresponding to multi-format.

Further, according to the embodiments, a rate of dependence on any hardware decreases, so that a number of parts can decrease. This enables the considerable cost to be deleted. If a data format to be used alters, it is possible to compensate for this by software update. It is also possible to deal with many AV data formats by software control in the same hardware. It is possible to decrease any design and/or manufacture costs of hardware. It is possible to perform modification, alteration, and/or addition of AV data format by only software update.

The embodiments of the invention are preferably applied to an AV server system that stores a data stream with a predetermined data format, which is obtained by coding and compressing audio/video data, in a high-capacity storage device or reproduces the data stream from the storage device to decode and de-compress the reproduced data stream.

It should be understood by those skilled in the art that various modifications, combinations, sub-combinations and alternations may occur depending on design requirements and other factors insofar as they are within the scope of the appended claims or the equivalents thereof.

What is claimed is:

1. An information recording/reproducing system comprising:
   a data storage device that stores a data stream with a predetermined data format; and
   an information recording/reproducing apparatus that records and reproduces the data stream, said information recording/reproducing apparatus being connected with the data storage device,
   wherein the information recording/reproducing apparatus includes:
   information recording/reproducing portion that records and reproduces the data stream;
   memory portion that stores plural species of empty data file bodies each in which additional information and data are assigned to loading regions, said additional information corresponding to a species of data format;
   selection portion that selects an empty data file body with a specified data format from the plural species of empty data file bodies that are stored in the memory portion; and
   information-loading portion that loads the additional information and the data into predetermined loading regions assigned in the empty data file body that has been selected by the selection portion,
   wherein the memory portion spreads the data stream with the predetermined data format that is read out of the data storage device;
   wherein the selection portion selects an empty data file body with a data format corresponding to a data file body that fills a data stream spread in the memory portion; and
   wherein the information recording/reproducing apparatus further includes control portion that allows for comparing the data file body that fills a data stream spread in the memory portion with the empty data file body selected by the selection portion to search the loading regions of the additional information and the data, and controls the memory portion to extract the additional information from the loading region of the additional information in the filled data file body and to extract the data from the loading region of the data in the filled data file body.

2. An information recording/reproducing apparatus comprising:
   information recording/reproducing portion that records and reproduces information;
   memory portion that stores plural species of empty data file bodies each in which additional information and data are assigned to loading regions, said additional information corresponding to a species of data format;
   selection portion that selects an empty data file body with a specified data format from the plural species of empty data file bodies that are stored in the memory portion; and
   information-loading portion that loads the additional information and data into predetermined loading regions assigned in the empty data file body that has been selected by the selection portion,
   wherein the memory portion spreads the data stream with the predetermined data format that is read out of the data storage device;
   wherein the selection portion selects an empty data file body with a data format corresponding to a data file body that fills a data stream spread in the memory portion; and
   wherein the information recording/reproducing apparatus further includes control portion that allows for comparing the data file body that fills a data stream spread in the memory portion with the empty data file body selected by the selection portion to search the loading regions of the additional information and the data, and controls the memory portion to extract the additional information from the loading region of the additional information in filled data file body and to extract the data from the loading region of the data in the filled data file body.

3. An information recording/reproducing method comprising the steps of:
   specifying, from the plural species of empty data file bodies each in which loading regions of additional information and data are assigned, said additional information corresponding to a species of data format, an empty data file body with a desired data format and selecting the empty data file body as;
   loading the additional information and the data into the predetermined loading regions assigned in the empty data file body that has been selected;
   reading a data stream with the predetermined data format out of a data storage system and spreading the read data stream;
   selecting an empty data file body with a data format corresponding to a data file body that fills the data stream thus spread;
   comparing the filled data file body thus spread with the empty data file body thus selected to search the loading regions each of the additional information and the data; and
   extracting the additional information from the loading of the additional information in the titled data file body and extracting the data from the loading region of the data in the filled data file body.

* * * * *